US008762750B2

(12) United States Patent
Aoyagi

(10) Patent No.: US 8,762,750 B2
(45) Date of Patent: Jun. 24, 2014

(54) INFORMATION PROCESSING APPARATUS AND METHOD OF CONTROLLING THE SAME

(75) Inventor: Takeshi Aoyagi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 622 days.

(21) Appl. No.: 12/389,095

(22) Filed: Feb. 19, 2009

(65) Prior Publication Data

US 2009/0210732 A1 Aug. 20, 2009

(30) Foreign Application Priority Data

Feb. 19, 2008 (JP) ................................. 2008-037948

(51) Int. Cl.
*G06F 1/00* (2006.01)
*G06F 1/26* (2006.01)
*G06F 1/32* (2006.01)
*G06F 15/00* (2006.01)
*G06F 15/76* (2006.01)

(52) U.S. Cl.
USPC .............................. 713/320; 713/324; 712/28

(58) Field of Classification Search
CPC .... G06F 3/0625; G06F 1/3287; G06F 1/3268
USPC ............... 712/28, E9.001; 713/300, 320, 324
See application file for complete search history.

(56) References Cited

U.S. PATENT DOCUMENTS

| 7,516,346 B2 * | 4/2009 | Pinheiro et al. ............... 713/324 |
| 2004/0054939 A1 * | 3/2004 | Guha et al. ..................... 713/300 |
| 2004/0225901 A1 * | 11/2004 | Bear et al. ...................... 713/300 |
| 2005/0182976 A1 * | 8/2005 | Berkes et al. .................. 713/300 |
| 2005/0289361 A1 * | 12/2005 | Sutardja ......................... 713/300 |
| 2006/0069870 A1 * | 3/2006 | Nicholson et al. ............. 711/118 |
| 2006/0143487 A1 * | 6/2006 | Kardach et al. ................ 713/320 |
| 2006/0212733 A1 * | 9/2006 | Hamilton ....................... 713/300 |
| 2008/0104204 A1 * | 5/2008 | Moore et al. ................... 709/219 |
| 2008/0168223 A1 * | 7/2008 | Reeves et al. .................. 711/114 |

(Continued)

FOREIGN PATENT DOCUMENTS

| JP | 2001-092603 | 4/2001 |
| JP | 2002-297320 A | 10/2002 |

(Continued)

OTHER PUBLICATIONS

Japanese Office Action dated May 7, 2012 for JP 2008-037948.

*Primary Examiner* — Kim Huynh
*Assistant Examiner* — Brandon Kinsey
(74) *Attorney, Agent, or Firm* — Carter, DeLuca, Farrell & Schmidt, LLP

(57) ABSTRACT

This invention provides an information processing apparatus which includes a first storage unit and a second storage unit and implements a function of causing the first storage unit and the second storage unit to store data redundantly while maintaining a power saving mode even upon receiving an access request from an external apparatus in the power saving mode, and a method of controlling the same. To accomplish this, upon receiving an HDD access request in the power saving mode, the information processing apparatus operates after transiting to an HDD access mode in which only minimum necessary functions are activated without activating the main CPU. The contents of the HDD changed during the HDD access mode are stored as history information. Upon transiting from the power saving mode to the normal operating mode, the data in another HDD is updated in accordance with the history information, thereby implementing a mirroring function.

8 Claims, 17 Drawing Sheets

(56) References Cited

U.S. PATENT DOCUMENTS

2008/0184042 A1* 7/2008 Parks et al. .................. 713/300
2008/0256307 A1* 10/2008 Fujimoto ...................... 711/154
2009/0006744 A1* 1/2009 Cavallo et al. ............... 711/114

FOREIGN PATENT DOCUMENTS

| JP | 2004-252570 | 9/2004 |
| JP | 2007-102579 A | 4/2007 |
| JP | 2008-030477 A | 2/2008 |

* cited by examiner

F I G. 2
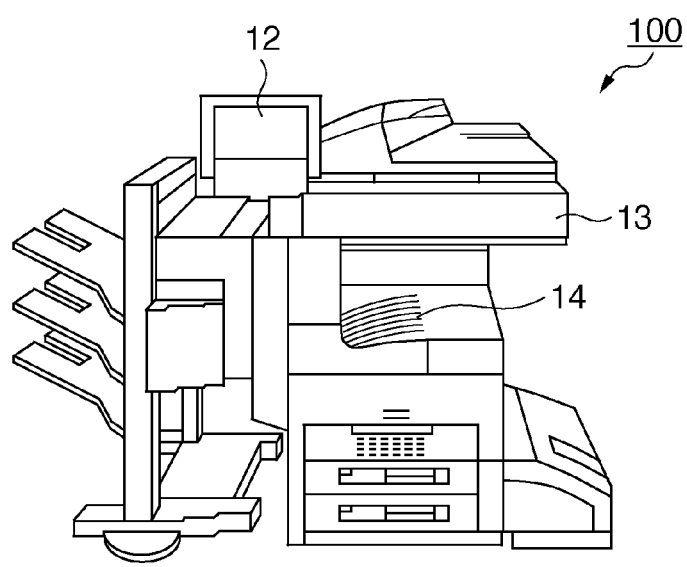

F I G. 13
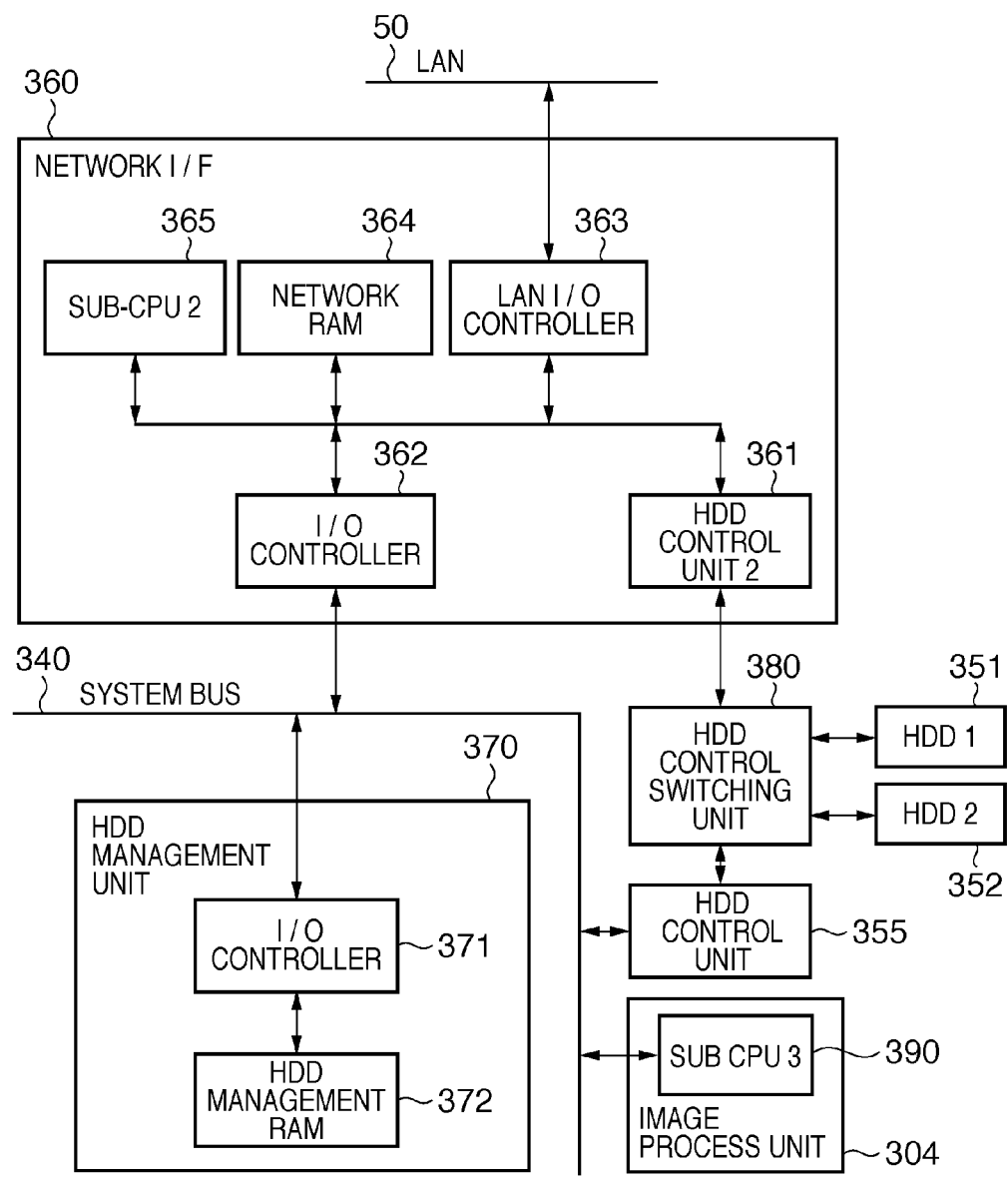

INFORMATION PROCESSING APPARATUS AND METHOD OF CONTROLLING THE SAME

BACKGROUND OF THE INVENTION

1. Field of the Invention

The present invention relates to an information processing apparatus including a plurality of storage devices, and a method of controlling the same.

2. Description of the Related Art

Recent information processing apparatuses are required to operate at low power, and various control methods have been proposed to reduce power consumption. In the computer industry, a mirroring technique is known, which holds identical data in a plurality of HDDs (Hard Disk Drives) to prevent a system down in case of a failure in one of the storage devices. Japanese Patent Laid-Open No. 2004-252570 proposes a system related to power control of a plurality of HDDs in mirroring.

To reduce power consumption, an interface unit (I/F) which is powered even in a low power state is used. This enables implementation of a power saving mode in which most parts of an information processing apparatus are powered off. More specifically, in the power saving mode, the I/F unit copes with a query from an external apparatus without resuming power supply to the entire information processing apparatus (e.g., Japanese Patent Laid-Open No. 2001-092603).

However, the above-described related arts have the following problems. For example, in the information processing apparatus described in Japanese Patent Laid-Open No. 2001-092603, upon receiving, from an external apparatus, a query or a request about information that is not held in the I/F unit, power supply to most part of the information processing apparatus needs to be resumed, resulting in an increase in power consumption. More specifically, the information processing apparatus sometimes receives data from an external apparatus connected via the I/F unit and stores it in the HDD. In this case, data storage in the HDD cannot be executed using only information held in the I/F unit or a memory for data storage. For this reason, if such a request is received, it is necessary to resume power supply to process blocks necessary in the information processing apparatus including the HDD. This increases power consumption.

In mirroring for always storing identical data in a plurality of HDDs to ensure their reliability, the HDDs used for mirroring increase power consumption.

SUMMARY OF THE INVENTION

The present invention is directed to an information processing apparatus which includes a first storage unit and a second storage unit and implements a function of causing the first storage unit and the second storage unit to store data redundantly while maintaining a power saving mode even upon receiving an access request from an external apparatus in the power saving mode, and a method of controlling the same.

One aspect of the present invention provides an information processing apparatus including a first storage unit and a second storage unit, comprising: a first control unit configured to control communication with an external apparatus and to write data received from the external apparatus to the first storage unit in a case where data is received from the external apparatus while the information processing apparatus operates in a first power saving mode; a second control unit configured to control writing data received from the external apparatus to both the first storage unit and the second storage unit in a case where the first control unit receives data from the external apparatus while the information processing apparatus operates in a normal operating mode; a power control unit configured to supply predetermined power to the first control unit and the second control unit while the information processing apparatus operates in the normal operating mode, and supply the predetermined power to the first control unit while reducing power supply to the second control unit while the information processing apparatus operates in the first power saving mode, and wherein the second control unit controls writing the data, written to the first storage unit while the information processing apparatus operates in the first power saving mode, to the second storage unit in a case where the information processing apparatus transits from the first power saving mode to the normal operating mode.

Another aspect of the present invention provides a method of controlling an information processing apparatus including a first storage unit, a second storage unit, a first control unit configured to control communication with an external apparatus, and a second control unit configured to control to write data received from the external apparatus to both the first storage unit and the second storage unit in a case where the first control unit receives data from the external apparatus while the information processing apparatus operates in a normal operating mode, the method comprising: executing first power control to control supplying predetermined power to the first control unit and the second control unit while the information processing apparatus operates in the normal operating mode; executing second power control to control supplying the predetermined power to the first control unit while reducing power supply to the second control unit while the information processing apparatus operates in the first power saving mode; executing first write control to cause the first control unit to control writing the data received from the external apparatus to the first storage unit in a case where data is received from the external apparatus while the information processing apparatus operates in the first power saving mode; executing second write control to cause the second control unit to control writing the data, written to the first storage unit while the information processing apparatus operates in the first power saving mode, to the second storage unit in a case where the information processing apparatus transits from the first power saving mode to the normal operating mode.

Further features of the present invention will become apparent from the following description of exemplary embodiments with reference to the attached drawings.

BRIEF DESCRIPTION OF THE DRAWINGS

FIG. 2 is a view showing the outer appearance of an image forming apparatus 100 according to the embodiment of the present invention;

FIG. 13 is a block diagram showing an arrangement example of a network I/F 360 and an HDD management unit 370 according to the second embodiment;

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

The first embodiment will be described below with reference to FIGS. 1 to 11. As an information processing apparatus according to this embodiment, an image forming apparatus will be explained below. However, the present invention is applicable to not only an image forming apparatus but also any other information processing apparatus including a plurality of storage units for storing identical data.

<Network Print System>

Figure 1:
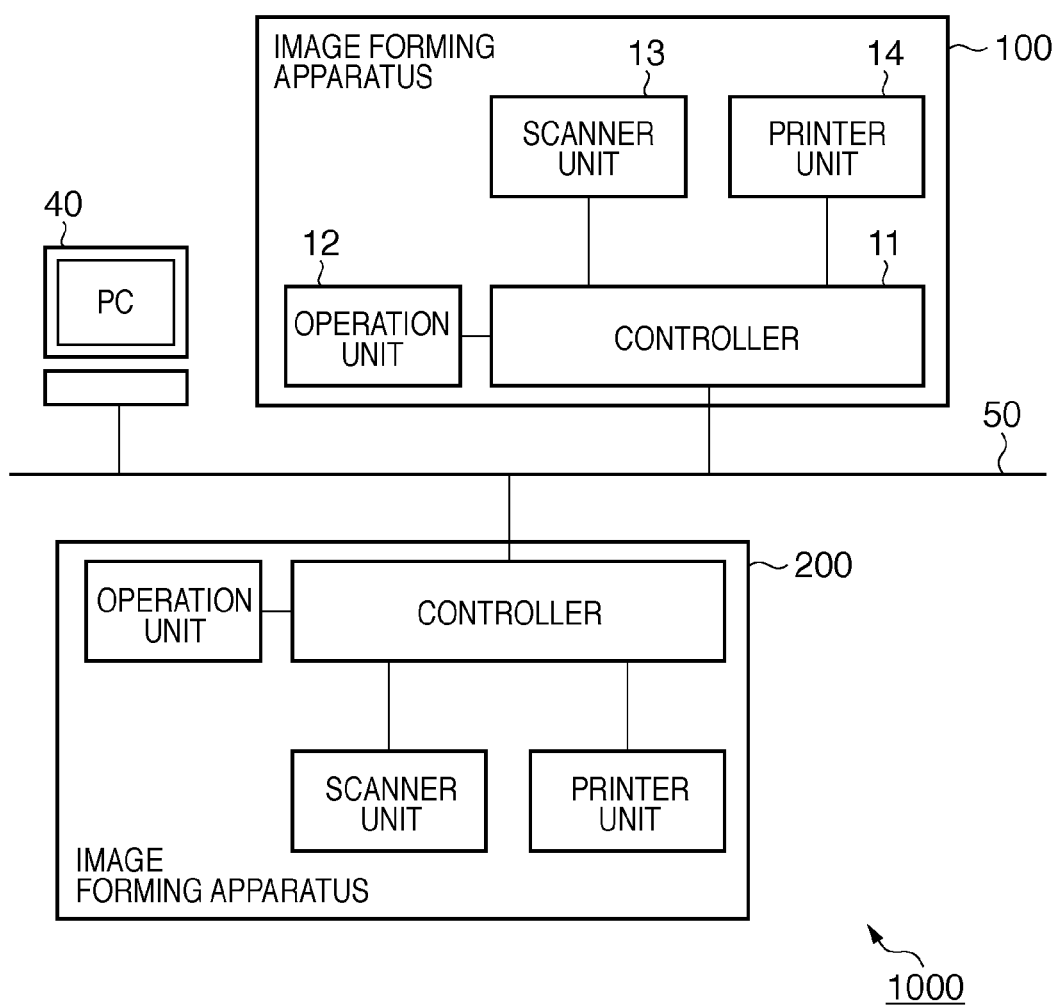
FIG. 1 is a block diagram showing the arrangement of a network print system 1000 according to an embodiment of the present invention.

A system according to the first embodiment will be described first with reference to FIG. 1. FIG. 1 is a block diagram showing the arrangement of a network print system 1000 according to the embodiment of the present invention.

In the network print system 1000, a host computer (to be referred to as a PC hereinafter) 40 and two image forming apparatuses 100 and 200 are connected to a LAN 50. In the present invention, the number of connected apparatuses is not limited to this. In this embodiment, a LAN is used as a connection method. However, the present invention is not limited to this.

The PC 40 has the functions of a personal computer and can transmit/receive a file or e-mail via the LAN 50 using, for example, an FTP protocol. The PC 40 can also output a print instruction to the image forming apparatuses 100 and 200 via a printer driver.

The image forming apparatuses 100 and 200 can exchange data. It is possible to transfer image data stored in, for example, the HDD of the image forming apparatus 100 to the image forming apparatus 200 and cause it to print the image. It is also possible to store image data scanned by the image forming apparatus 200 in, for example, the HDD of the image forming apparatus 100.

<Arrangement of Image Forming Apparatus>

The arrangements of the image forming apparatuses 100 and 200 each serving as an information processing apparatus will be described below. The arrangement of the image forming apparatus 100 will be explained here. The image forming apparatus 200 has the same arrangement as the image forming apparatus 100.

As shown in FIG. 1, the image forming apparatus 100 includes a scanner unit 13 serving as an image input device, a printer unit 14 serving as an image output device, a controller 11, and an operation unit 12 serving as a user interface. To suppress power consumption, the image forming apparatus 100 has three operating modes: normal operating mode, HDD access mode (first power saving mode), and power saving mode (second power saving mode). These operating modes will be described later in detail. Transition of the operating modes is done by the controller 11 which functions as a mode transition unit.

FIG. 2 is a view showing the outer appearance of the image forming apparatus 100 according to the embodiment of the present invention. The scanner unit 13 exposes and scans an image on an original and inputs thus obtained reflected light to a CCD, thereby converting image information into an electrical signal. The scanner unit 13 further converts the electrical signal into RGB luminance signals and outputs them to the controller 11 as an image signal.

When the user inputs an original reading start instruction via the operation unit 12, the controller 11 outputs an original reading instruction to the scanner unit 13. Upon receiving the instruction, the scanner unit 13 reads the original. The printer unit 14 is an image forming device which forms, on a paper sheet, an image of image data received from the controller 11.

<Arrangement of Controller>

Figure 3:
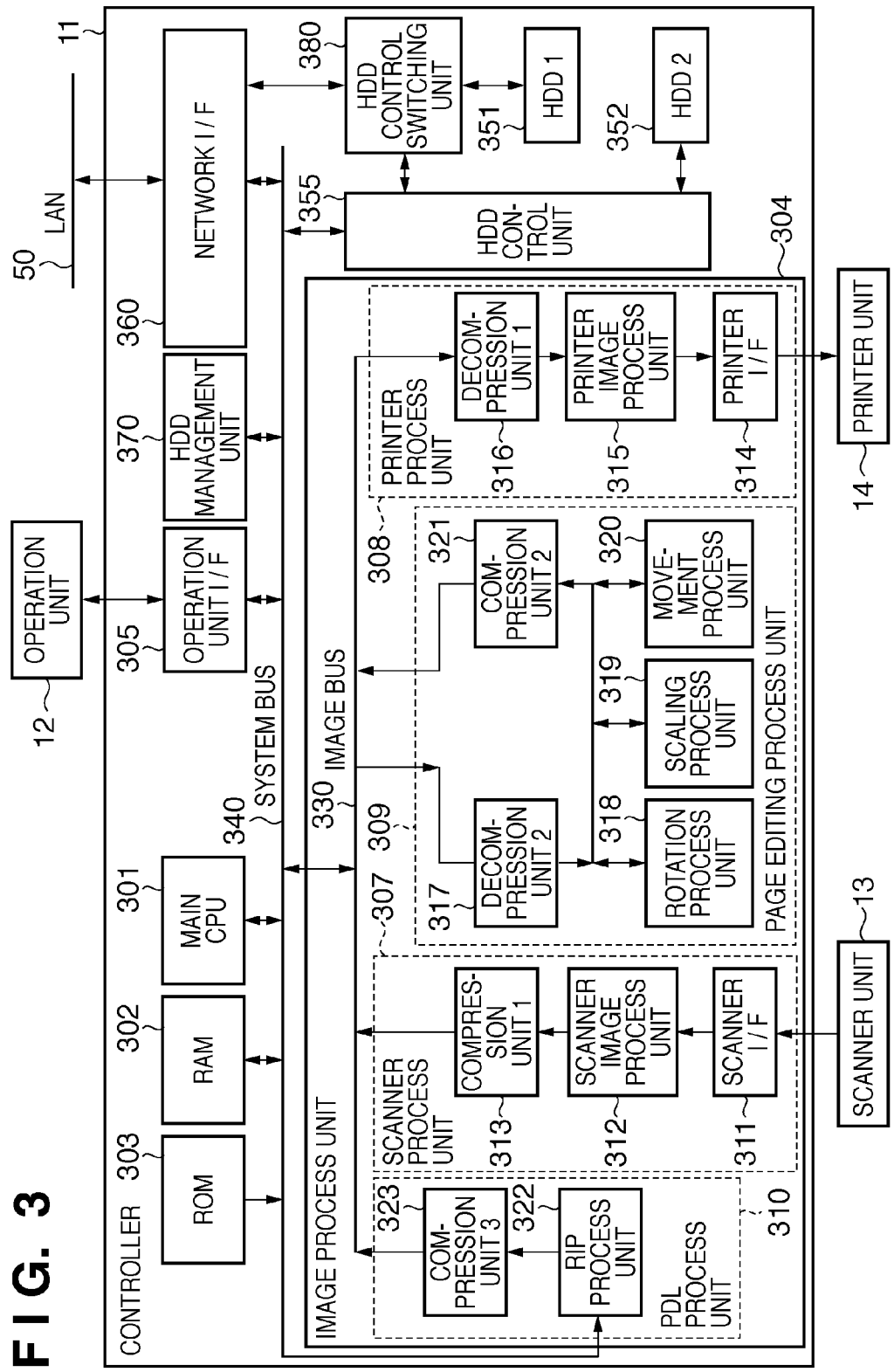
FIG. 3 is a block diagram showing the arrangement of a controller 11 of the image forming apparatus 100 according to the first embodiment.

The control arrangement of the image forming apparatus will be described next with reference to FIG. 3. FIG. 3 is a block diagram showing the arrangement of the controller 11 of the image forming apparatus 100 according to the first embodiment. The controller 11 is electrically connected to the scanner unit 13 and the printer unit 14 and also connected to the PC 40 and other image forming apparatuses via the LAN 50. This allows input/output of image data and device information.

The controller 11 includes a main CPU 301, RAM 302, ROM 303, image process unit 304, operation unit I/F 305, HDD control unit 355, HDD 351 (first storage unit), HDD 352 (second storage unit), HDD control switching unit 380, HDD management unit 370, and network I/F 360. These control blocks are connected via a system bus 340.

The main CPU 301 systematically controls access to various connected devices based on, for example, control programs stored in the ROM 303. The main CPU 301 also systematically controls various kinds of processes executed in the controller 11.

The RAM 302 serves as a system work memory for the operation of the main CPU 301 and also as a memory for temporarily storing image data. The RAM 302 includes a nonvolatile NVRAM which holds stored contents even after power OFF, and a volatile DRAM which erases stored contents after power OFF.

The operation unit I/F 305 is an interface to connect the system bus 340 to the operation unit 12. The operation unit I/F 305 receives image data to be displayed on the operation unit 12 from the system bus 340 and outputs it to the operation unit 12. The operation unit I/F 305 also outputs information input from the operation unit 12 to the system bus 340.

The network I/F 360 is connected to the LAN 50 and the system bus 340 to control communication with an external apparatus connected via the LAN 50. The network I/F 360 has a proxy response function that is a characteristic feature of the present invention. In the power saving mode, the network I/F 360 responds to a query from the external apparatus without power supply to the overall image forming apparatus 100.

<Network I/F 360>

Figure 4:
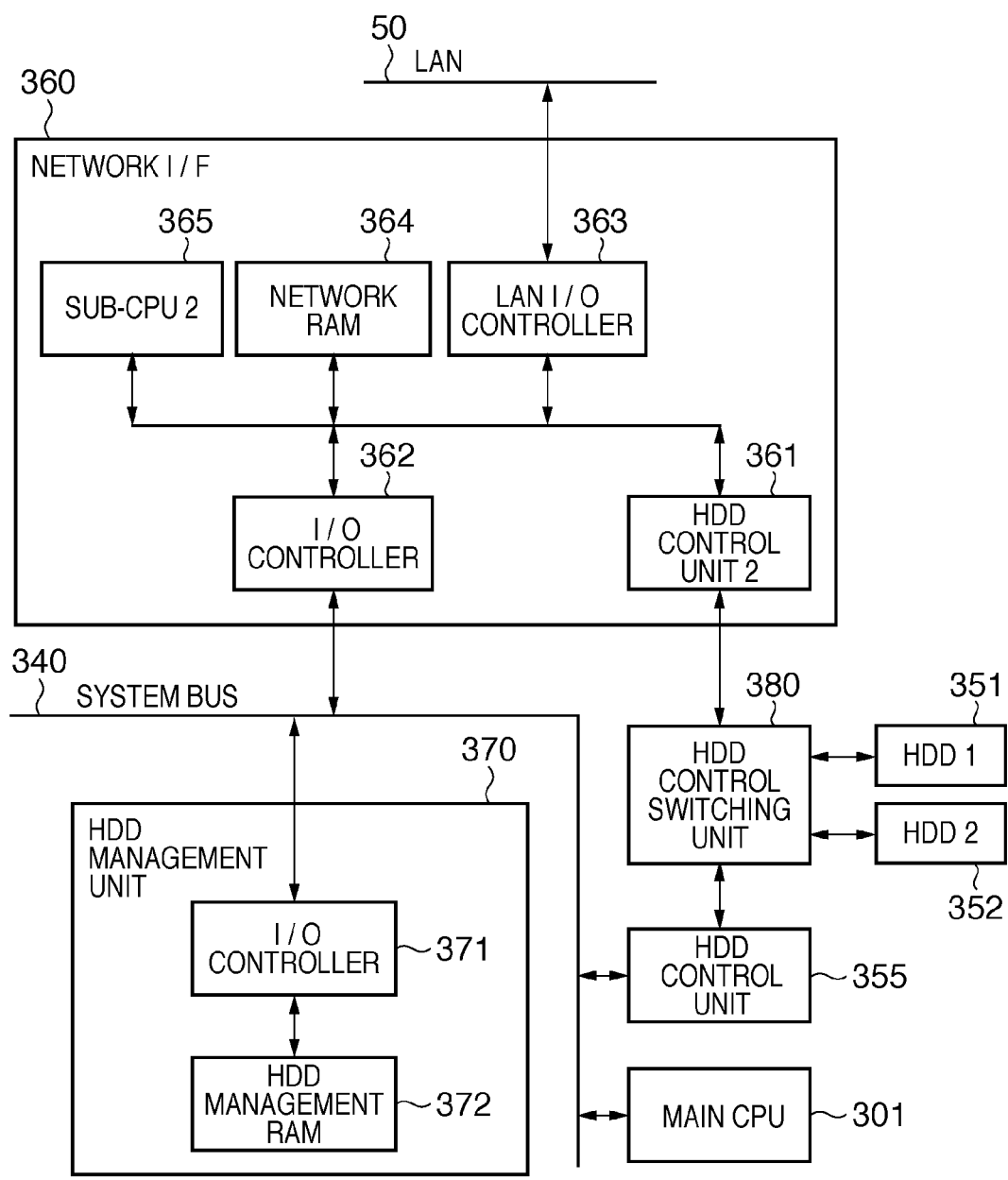
FIG. 4 is a block diagram showing an arrangement example of a network I/F 360 and an HDD management unit 370 according to the first embodiment.

Details of the network I/F 360 (first control unit) will be described below with reference to FIGS. 3 and 4. FIG. 4 is a block diagram showing an arrangement example of the network I/F 360 and the HDD management unit 370 according to the first embodiment. FIG. 4 also illustrates the connection state of the HDD control switching unit 380, HDD control unit 355, HDD 351, HDD 352, and main CPU 301.

According to this embodiment, the network I/F 360 processes reception and transmission of various kinds of data via the LAN 50 and also processes a status query from an external apparatus in the power saving mode. Upon receiving an HDD access request from the LAN 50 in the power saving mode, the network I/F 360 transits the operating mode to the HDD access mode to control the HDD 351. Hence, in the HDD access mode, data readout from the HDD 351 or data write in the HDD 351 (first write control step) can be performed without activating the main CPU 301.

As shown in FIG. 4, the network I/F 360 includes a sub-CPU 365, LAN I/O controller 363, network RAM 364, I/O controller 362, and HDD control unit 361.

The network RAM 364 functions as a response data storage unit and stores, in advance, response data for each access request from the LAN 50 in the power saving mode. The sub-CPU 365 confirms the state of the LAN I/O controller 363, and upon receiving an access request to the image forming apparatus 100 from the LAN 50, analyzes the contents of the request. If a reply to the LAN 50 is necessary in response to the access request, the sub-CPU 365 reads out response data corresponding to the access request from the network RAM 364 and returns it. Upon receiving an HDD access request from the LAN 50 in the power saving mode, the HDD control unit 361 controls data write in the HDD 351 or data readout from the HDD 351 in the image forming apparatus 100. At this time, the HDD control unit 361 is systematically controlled by the sub-CPU 365 in the network I/F 360.

Control of data input/output to/from the HDD 351 by the network I/F 360 will be described. A detailed example of an access request associated with data output (readout) from the HDD 351 is as follows. For example, another image forming apparatus (image forming apparatus 200 in this embodiment) requests readout of image data from the HDD 351 to acquire and print the image data in the HDD 351 of the image forming apparatus 100 via the LAN 50. In this case, the operation unit of the image forming apparatus 200 requests the image forming apparatus 100 to output a list of data stored in the HDD 351 of the image forming apparatus 100.

In response to this request, the image forming apparatus 100 sends, to the image forming apparatus 200, a list of directories in the HDD 351 and the names of files stored in the directories, which are recorded in the HDD file management unit in the HDD 351. In the image forming apparatus 200, the received data list is displayed on the monitor of the operation unit. A file to be printed is selected based on the information. After that, the directory and file name of a file selected via the operation unit of the image forming apparatus 200 are sent to the image forming apparatus 100 via the LAN 50. The network I/F 360 outputs the file in the designated directory in the HDD 351.

A detailed example of an access request associated with data input (write) in the HDD 351 is as follows. For example, another image forming apparatus (image forming apparatus 200 in this embodiment) transmits scanned image data to the image forming apparatus 100 via the LAN 50 and stores it in the HDD 351 of the image forming apparatus 100. In this case, the operation unit of the image forming apparatus 200 requests output of the list of the directories in the HDD 351 of the image forming apparatus 100.

In response to this request, a list of information of the directories in the HDD 351, which are recorded in the HDD file management unit in the HDD 351, is sent to the image forming apparatus 200. On the image forming apparatus 200, the user confirms the received directory list on the monitor of the operation unit, and selects a directory in the HDD 351 of the image forming apparatus 100 to store the scanned data. The name of the file to store the data may be designated via the operation unit of the image forming apparatus 200.

Next, the image forming apparatus 200 performs the scan operation and predetermined image processing, and outputs data via the LAN 50. At this time, the image forming apparatus 200 also outputs information representing the directory in the image forming apparatus 100 to store the data and the file name to be used.

The data from the image forming apparatus 200 is sent to the image forming apparatus 100 via the LAN 50 and written in the designated directory in the HDD 351 using the designated file name. In the HDD access mode, the history representing the write-accessed directory in the HDD 351 and the used file name is recorded in the HDD management unit 370 (to be described later) and used as information in a synchronization mode (to be described later).

<HDD Management Unit 370>

The HDD management unit 370 will be described next. The HDD management unit 370 functions as a history storage unit. If the data stored in the HDD 351 have changed because of, for example, data write or data deletion in the HDD access mode, the HDD management unit 370 holds information representing the data change and its contents as history information. For example, if data stored in the HDD 351 has changed, the name of the file, the storage directory in the HDD, and information representing deletion or addition of the file are stored. When the mode transits to the normal operating mode, the contents of the HDD 352 are updated in accordance with the history information based on the data in the HDD management unit 370 (second write control step), thereby implementing a mirroring function of storing data redundantly in the HDDs 351 and 352.

As shown in FIG. 4, the HDD management unit 370 includes an I/O controller 371 and an HDD management RAM 372. The I/O controller 371 serves as an I/F which transmits/receives control signals and data between the HDD management RAM 372 and the sub-CPU 365 in the network I/F 360 via the system bus 340. The HDD management RAM 372 is controlled by a control signal from the sub-CPU 365 in the network I/F 360.

<HDD Control Unit 355>

The HDD control unit 355 (second control unit) will be described next. The HDD 351 is connected to the HDD control unit 355 via the HDD control switching unit 380. The HDD 352 is directly connected to the HDD control unit 355. In this embodiment, the two HDDs 351 and 352 form a mirroring system. The HDDs 351 and 352 store various kinds of data such as document data, image data, and system software.

The HDD control unit 355 of this embodiment has not only the mirroring function but also a synchronization function, which operate as a mirroring mode and a synchronization mode, respectively. The mirroring function is a function of performing an operation of, for example, writing or deleting one data in or from both of the HDDs 351 and 352 simultaneously, like a normal mirroring operation. This always makes the contents of the HDDs 351 and 352 match each other. With the mirroring function, even when one HDD becomes unusable because of, for example, a failure, the internal data can be read out from the other HDD. This implements reliable data storage.

The synchronization function is a function of updating the data stored in the HDD 352 in accordance with the above-described history information and making the data match the data contents stored in the HDD 351. In this embodiment, if the data contents stored in the HDD 351 have changed in the HDD access mode, the data contents stored in the HDD 351 are made to match the data contents stored in the HDD 352 based on the history information in the HDD management unit 370. For example, if data is deleted from the HDD 351 in the HDD access mode, the same file is deleted from the HDD 352 upon returning to the normal operating mode. Alternatively, if data is added to the HDD 351 in the HDD access mode, the file is copied from the HDD 351 to the same directory in the HDD 352 upon returning to the normal operating mode.

Figure 5:
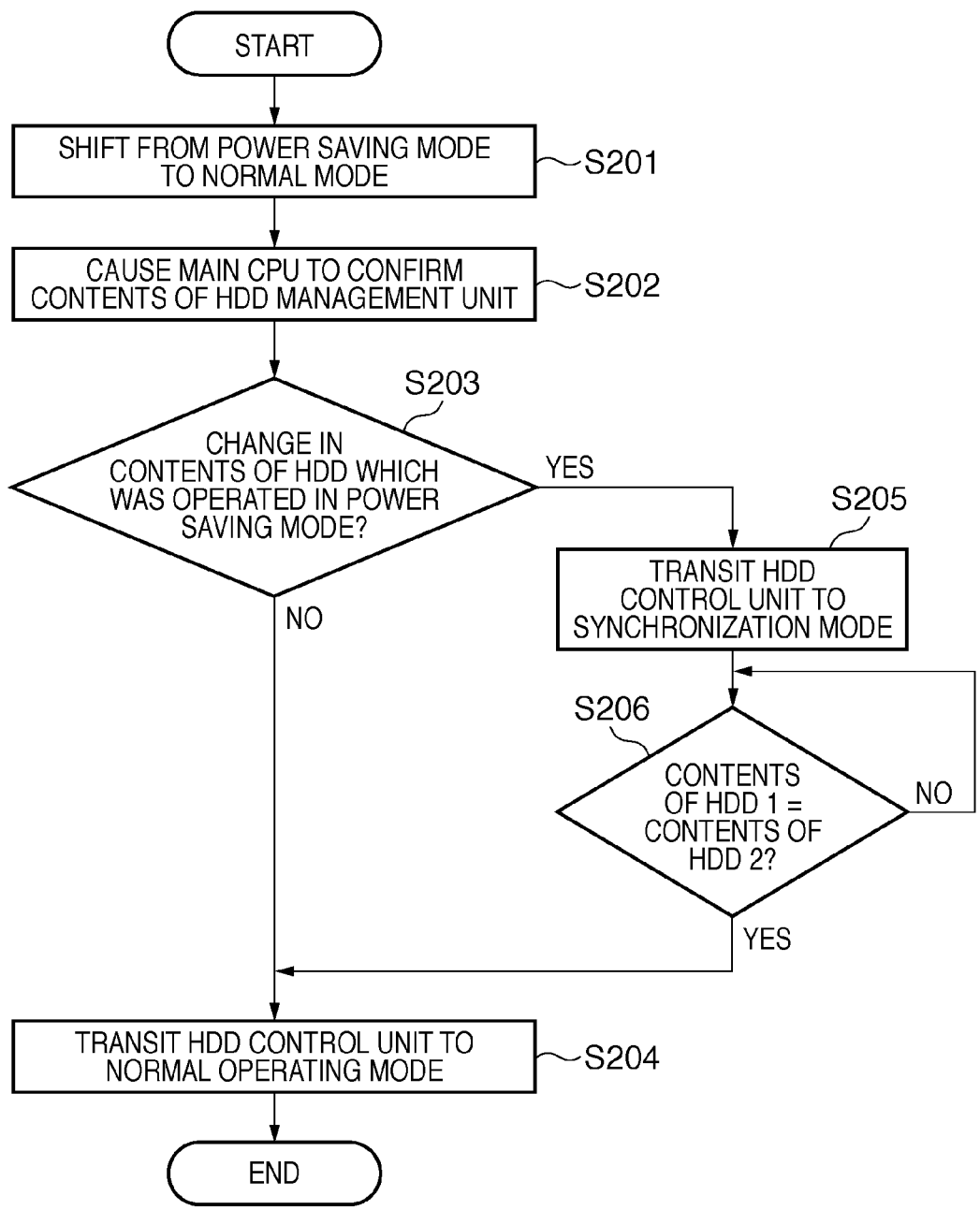
FIG. 5 is a flowchart illustrating the process procedure of an HDD control unit 355 according to the first embodiment.

The process of the HDD control unit 355 in transition of the operating mode will be described with reference to FIG. 5. FIG. 5 is a flowchart illustrating the process procedure in transition from the power saving mode to the normal operating mode according to the first embodiment.

In step S201, the operating mode of the image forming apparatus 100 transits from the power saving mode to the normal operating mode so that the apparatus is activated as the process blocks are powered on.

In steps S202 and S203, the main CPU 301 confirms the contents of the HDD management unit 370 and determines whether the contents of the HDD 351 which was operated in the power saving mode have changed. Upon determining that "no change has occurred" (NO in step S203), the main CPU 301 advances the process to step S204. On the other hand, upon determining that "a change has occurred" (YES in step S203), the main CPU 301 advances the process to step S205.

In step S204, the HDD control unit 355 transits the state to the mirroring mode in the normal operating mode and ends the process. The image forming apparatus 100 also transits to the normal operating mode.

In step S205, the HDD control unit 355 transits the state to the synchronization mode in the normal operating mode and reflects the change contents of the HDD 351 to the HDD 352. In step S206, the HDD control unit 355 determines whether the contents of the HDD 351 match those of the HDD 352. If the contents match (YES in step S206), the HDD control unit 355 advances the process to step S204 to transit the operating mode to the normal operating mode. If the contents do not match (NO in step S206), the HDD control unit 355 periodically performs the determination in step S206 until the contents of the two HDDs 351 and 352 match.

<HDD Control Switching Unit 380>

The HDD control switching unit 380 will be described next. The HDD control switching unit 380 includes a selector circuit. In the normal operating mode, the selector circuit switches the control of the HDD 351 to the HDD control unit 355 in accordance with an instruction from the sub-CPU 365 in the network I/F 360. In the HDD access mode, the selector circuit switches the control of the HDD 351 to the HDD control unit 361 in the network I/F 360.

In the normal operating mode, the HDD control switching unit 380 selects control using the HDD control unit 355. Under the control of the main CPU 301 and the HDD control unit 355, the mirroring operation is performed in the two HDDs 351 and 352. At this time, the HDD control unit 355 is in the mirroring mode. Details of the operation of the image forming apparatus 100 in the normal operating mode will be described later.

HDD control in the power saving mode and the HDD access mode will be described below. In the power saving mode, only the network I/F 360 of the image forming apparatus 100 is powered on. Hence, the network I/F 360 copes with a simple response such as main body status notification.

When an HDD access request is input from the LAN 50 to the image forming apparatus 100, the image forming apparatus 100 transits the operating mode to the HDD access mode. In this case, the image forming apparatus 100 supplies power to the HDD management unit 370, HDD control switching unit 380, and HDD 351 to do data input/output to/from the HDD 351 in accordance with a request from the sub-CPU 365 in the network I/F 360. The HDD control switching unit 380 switches the control of the HDD 351 to the sub-CPU 365 and the HDD control unit 361 in the network I/F 360. If the contents of the HDD 351 which is operating in the HDD access mode have changed due to, for example, write or deletion, the information is stored in the HDD management unit 370.

When the power saving mode transits to the normal operating mode, process blocks including the main CPU 301 and the HDD control unit 355 are activated. The HDD control switching unit 380 switches the control of the HDD 351 to the main CPU 301 and the HDD control unit 355.

If the main CPU 301 determines that the information representing a change in the contents of the HDD 351 is stored in the HDD management unit 370, the HDD control unit 355 transits to the synchronization mode. The HDD control unit 355 operates to reflect the changed contents of the HDD 351 which was operated in the sleep mode to the HDD 352 which was powered off then so that the contents of the two HDDs match. When the data contents stored in the two HDDs match, the HDD control unit 355 switches to the mirroring mode in the normal operating mode so that the image forming apparatus also performs a normal operation.

<Image Process Unit 304>

Details of the image process unit 304 will be described next with reference to FIG. 3. The image process unit 304 includes a PDL process unit 310, scanner process unit 307, page editing process unit 309, and printer process unit 308. An image bus 330 is a transmission path to exchange image data and is formed from a bus such as a PCI bus.

The scanner process unit 307 will be described. The scanner process unit 307 includes a compression unit 313, scanner image process unit 312, and scanner I/F 311.

The scanner image process unit 312 performs processes such as correction and manipulation for image data received from the scanner unit 13 via the scanner I/F 311. For example, the scanner image process unit 312 determines whether the received image data is color or monochrome, or whether the image data is a text or a photo. The determination result is added to the image data. The added information is called image attribute information. The compression unit 313 receives image data, compresses it, for example, using the JPEG format, and outputs the compressed data to the image bus 330.

Figure 6:
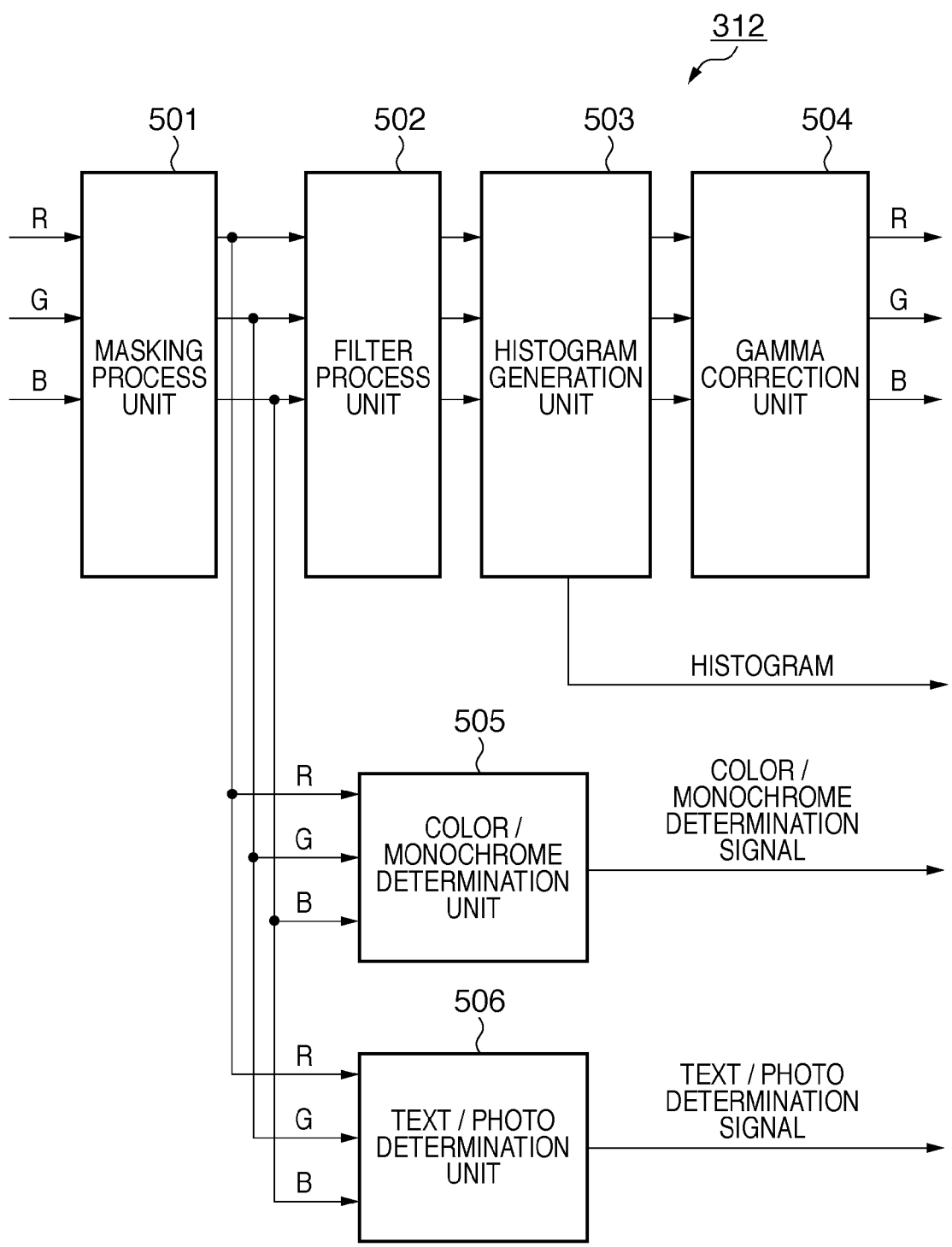
FIG. 6 is a block diagram showing the internal arrangement of a scanner image process unit 312 according to the first embodiment.

FIG. 6 is a block diagram showing the internal arrangement of the scanner image process unit 312 according to the first embodiment. The scanner image process unit 312 includes a masking process unit 501, filter process unit 502, histogram generation unit 503, gamma correction unit 504, color/monochrome determination unit 505, and text/photo determination unit 506.

The scanner image process unit 312 receives image data formed from RGB luminance signals each having 8 bits. The masking process unit 501 converts the luminance signals into standard luminance signals independent of the filter color of the CCD. The filter process unit 502 arbitrarily corrects the spatial frequency of the image data output from the masking process unit 501. The filter process unit 502 executes an arithmetic process using, for example, a 7×7 matrix for the image data.

The histogram generation unit 503 samples the luminance data of each pixel of the image data output from the filter process unit 502. More specifically, the histogram generation unit 503 samples the luminance data at a predetermined pitch in the main- and sub-scanning directions in a rectangular region defined by start and end points designated in the main- and sub-scanning directions. The histogram generation unit 503 generates histogram data based on the sampling result. The generated histogram data is used to estimate a background level in a background removal process which is executed as a post-process. The gamma correction unit 504 converts the RGB luminance data input from the histogram generation unit 503 into luminance data having nonlinearity using, for example, a lookup table.

The color/monochrome determination unit 505 determines for the image data output from the masking process unit 501 whether each pixel has a chromatic color or an achromatic color. The determination result is added to the image data as a color/monochrome determination signal (part of the image attribute information). The text/photo determination unit 506 determines for the image data output from the masking process unit 501 whether each pixel is included in a character or an object (e.g., photo) except a character. The determination result is added to the image data as a text/photo determination signal (part of the image attribute information).

The printer process unit 308 will be described next. The printer process unit 308 includes a printer I/F 314, printer image process unit 315, and decompression unit 316.

The decompression unit 316 decompresses image data input from the image bus 330. The printer image process unit 315 performs processes such as correction and manipulation for the decompressed image data. The printer image process unit 315 also changes the process contents based on the histogram, color/monochrome determination signal, and text/photo determination signal generated in the scanner image process unit 312. The printer I/F 314 outputs the data output from the printer image process unit 315 to the printer unit 14.

Figure 7:
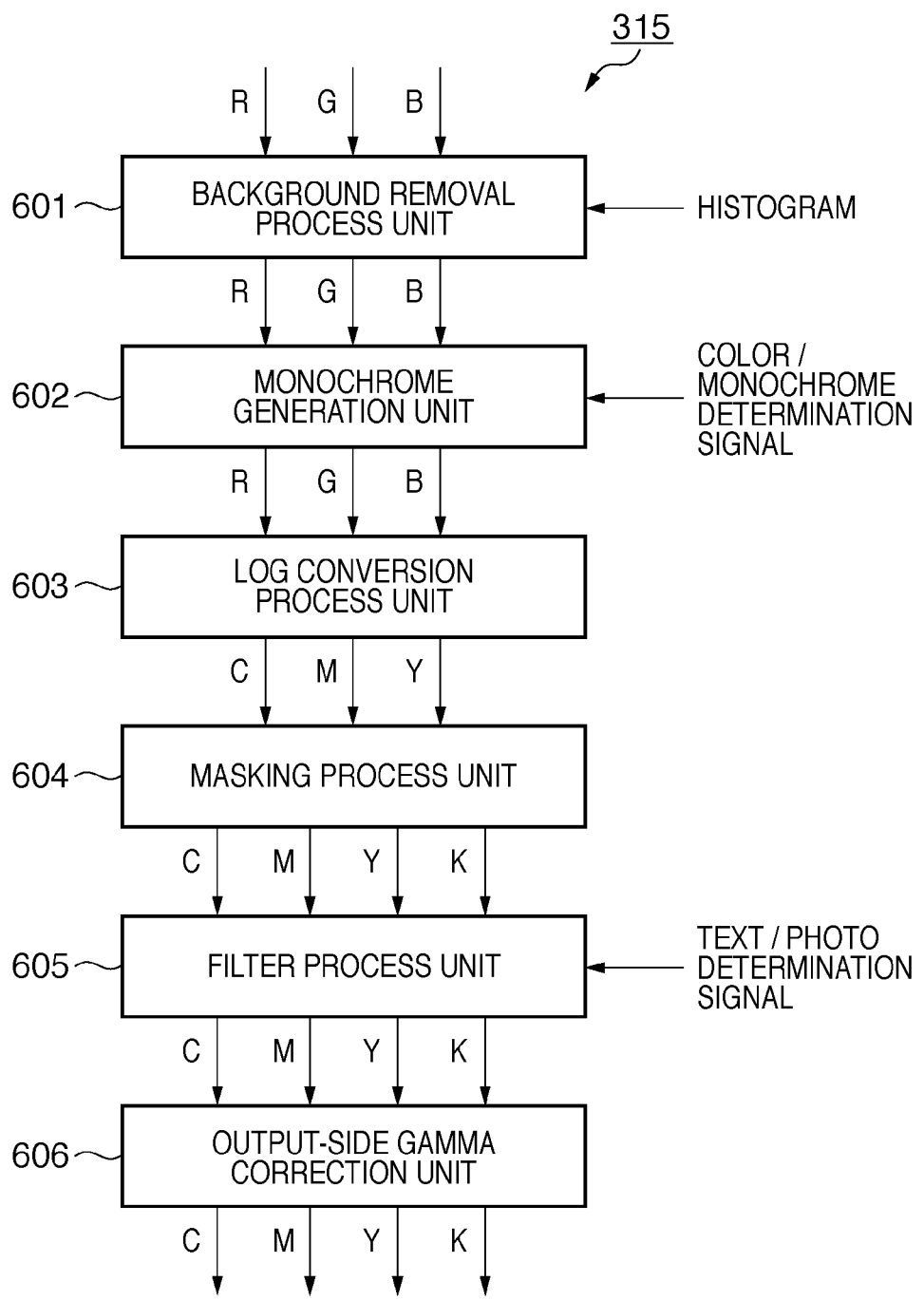
FIG. 7 is a block diagram showing the internal arrangement of a printer image process unit 315 according to the first embodiment.

FIG. 7 is a block diagram showing the internal arrangement of the printer image process unit 315 according to the first embodiment. The printer image process unit 315 includes a background removal process unit 601, monochrome generation unit 602, LOG conversion process unit 603, masking process unit 604, filter process unit 605, and output-side gamma correction unit 606.

The background removal process unit 601 converts all RGB luminance signals determined to be a background portion into maximum luminance signals using the histogram generated in the scanner image process unit 312, thereby removing the background color of the image data. If the color/monochrome determination signal generated in the scanner image process unit 312 represents a monochrome image, the monochrome generation unit 602 obtains the average value of the RGB values of each pixel of the image data input from the background removal process unit 601 and replaces each of the RGB values of the pixel with the obtained value. This allows the masking process unit 604 (to be described later) to generate monochrome K print data.

The LOG conversion process unit 603 performs luminance-density conversion from RGB to CMY using, for example, a lookup table. If the monochrome generation unit 602 has converted all the CMY data into the same value, monochrome K data is obtained. Hence, monochrome image data is generated. The masking process unit 604 sets the minimum value of the CMY image data generated by the LOG conversion process unit 603 as the K data value to be output, and sets values obtained by subtracting the K data value from the input CMY values as the CMY data values to be output.

The filter process unit 605 arbitrarily corrects the spatial frequency of the image data output from the masking process unit 604. The filter process unit 605 executes an arithmetic process using, for example, a 7×7 matrix for the image data. The output-side gamma correction unit 606 performs correction to make the signal values input to it become proportional to the reflection density values after copy output.

The page editing process unit 309 will be described next. The page editing process unit 309 includes a decompression unit 317, rotation process unit 318, scaling process unit 319, movement process unit 320, and compression unit 321. The decompression unit 317 decompresses compressed image data input from the image bus 330 and supplies the decompressed image data to various kinds of process units.

The rotation process unit 318 rotates each page of the received image data by 90°, 180°, or 270° to generate output data. The scaling process unit 319 enlarges or reduces the image data using various interpolation or thinning algorithms to generate output data.

The movement process unit 320 controls movement of the image data processed by the rotation process unit 318 or scaling process unit 319, thereby adjusting the output position of each page data. This implements a process of integrating a plurality of pages into one page, like 2-in-1 output or 4-in-1 output, or a process of dividing enlarged image data of one page into, for example, four pages and outputting them. The compression unit 321 receives the image data which has undergone various processes, compresses it using, for example, the JPEG format, and outputs the compressed data to the image bus 330.

The PDL process unit 310 and PDL printing will be described next. The PDL process unit 310 includes a RIP process unit 322 and a compression unit 323. PDL data sent from the PC 40 via the LAN 50 is stored in the RAM 302 via the network I/F 360. The PDL data is also interpreted by the main CPU 301, and resultant intermediate data is sent to the RIP process unit 322.

The RIP process unit 322 renders the intermediate data to generate raster image data. The generated raster image data is sent to the compression unit 323 and compressed using, for example, the JPEG format. The image data compressed by the compression unit 323 is output to the image bus 330 and sent to the RAM 302 via the system bus 340.

PDL printing which uses the main CPU 301 is an operation in the normal operating mode. In PDL printing, data stored in the RAM 302 is read out and written in the HDD. At this time, the HDD control switching unit 380 switches the control of the HDD 351 to the HDD control unit 355 and the main CPU 301. With the mirroring function of the HDD control unit 355, the data is written in both the HDDs 351 and 352. After that, the image data is transferred to the printer process unit 308 via the system bus 340 and the image bus 330. The image data is further sent to the printer unit 14 so that an image is formed on a paper sheet.

The image data temporarily passes through the HDD to handle image data in a size that cannot be dealt with in the area of the RAM 302. For example, this process assumes that image data of a plurality of pages should be printed to create a plurality of copies, or a work area will be necessary for a page replacement process or the like.

<Normal Operating Mode>

The normal operating mode will be described next. In the normal operating mode, not only the above-described PDL printing but also HDD storage of copy data or scan data is also set from the operation unit 12. This operation is performed in the normal operating mode. Data output from the HDD to the LAN and data input from the LAN to the HDD are assumed to be done even in the normal operating mode except the above-described power saving mode and HDD access mode. In this case, these operations are done in the normal operating mode. That is, all functions of the image forming apparatus 100 are enabled in the normal operating mode.

In the normal operating mode, the HDD control switching unit 380 selects control using the HDD control unit 355 so that control is switched to the main CPU 301 and the HDD control unit 355. The image forming apparatus 100 performs the mirroring operation for the two HDDs 351 and 352. At this time, the HDD control unit 355 is in the mirroring mode. Details of the operation of the image forming apparatus 100 in the normal operating mode will be described below.

A copy operation will be described. The scanner unit 13 reads an original and sends the image data to the scanner image process unit 312 via the scanner I/F 311. The scanner image process unit 312 executes, for the image data, the processes described above with reference to FIG. 6. The compression unit 313 compresses the image data using, for example, the JPEG format. The image data compressed by the compression unit 313 is stored in the RAM 302 via the image bus 330 and the system bus 340. Note that the image data is sent to the page editing process unit 309, subjected to image processing as needed, and then stored in the RAM 302.

After that, the image data is read out from the RAM 302 and written in the HDD. At this time, the HDD control switching unit 380 switches control of the HDD 351 to the HDD control unit 355 and the main CPU 301. With the mirroring function of the HDD control unit 355, identical image data are written in both the HDDs 351 and 352.

Next, the image data is read out from the HDD via the HDD control unit 355. The HDD control unit 355 reads out the data from the HDD 351 and sends it to the system bus 340. Then, the image data is sent from the system bus 340 to the decompression unit 316 via the image bus 330.

The decompression unit 316 decompresses the image data. The decompressed image data is sent to the printer image process unit 315. The printer image process unit 315 executes, for the image data, the processes described above with reference to FIG. 7. The image data which has undergone the processes of the printer image process unit 315 is sent to the printer unit 14 via the printer I/F 314. The image data temporarily passes through the HDD for the same reason as in the above-described PDL printing.

An operation of storing scanned image data in the HDD will be described next. The scanner unit 13 reads an original and sends the image data to the scanner image process unit 312 via the scanner I/F 311. The scanner image process unit 312 executes, for the image data, the processes described above with reference to FIG. 6. The compression unit 313 compresses the image data using, for example, the JPEG format. The image data compressed by the compression unit 313 is stored in the RAM 302 via the image bus 330 and the system bus 340. Note that the image data is sent to the page editing process unit 309, subjected to image processing as needed, and then stored in the RAM 302.

After that, the image data is read out from the RAM 302, added with a file name in accordance with a user setting, and written in a predetermined directory on the HDD. At this time, the HDD control switching unit 380 switches control of the HDD 351 to the HDD control unit 355 and the main CPU 301. With the mirroring function of the HDD control unit 355, the data is written in both the HDDs 351 and 352.

An operation of outputting data from the HDD to the LAN 50 in the normal operating mode will be described next. In this case, the HDD control switching unit 380 switches control of the HDD 351 to the HDD control unit 355 and the main CPU 301.

An output request for stored image data is input from the LAN 50 to the HDD in the image forming apparatus 100 via the network I/F 360. Upon receiving the output request, the main CPU 301 analyzes information such as the file name and the output destination of the LAN 50. Based on the analyzed information, the main CPU 301 outputs the designated file data from the HDD 351 via the HDD control unit 355 and sends the data to the designated partner on the LAN 50 via the network I/F 360.

An operation of writing data input from the LAN 50 in the HDD of the image forming apparatus 100 in the normal operating mode will be described next.

A data storage request and data to be stored are input from the LAN 50 to the HDD in the image forming apparatus 100 via the network I/F 360. Upon receiving the data storage request, the main CPU 301 analyzes information such as the file name for storage. Simultaneously, the data to be stored is temporarily saved in the RAM 302.

Based on the analyzed information, the main CPU 301 writes the data saved in the RAM 302 in a predetermined directory on the HDD via the HDD control unit 355. At this time, the HDD control switching unit 380 switches control of the HDD 351 to the HDD control unit 355 and the main CPU 301. With the mirroring function of the HDD control unit 355, the data is written in both the HDDs 351 and 352.

The internal process blocks of the image forming apparatus 100 and the data flow in the operation of each mode have been described above.

<Power Supply>

Figure 8:
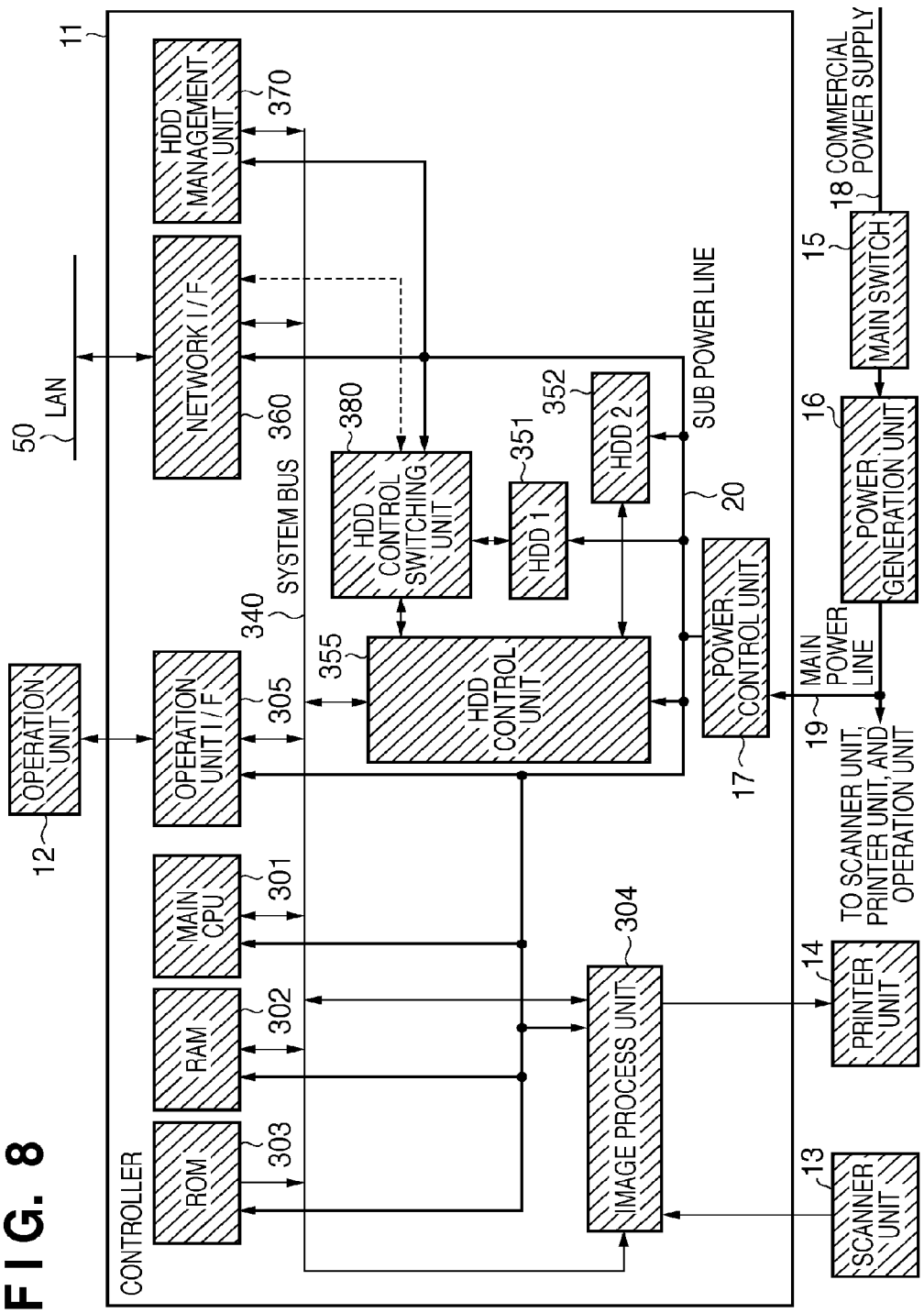
FIG. 8 is a block diagram showing power supply in the normal operating mode of the image forming apparatus 100 according to the first embodiment.

Power supply to the process blocks of the image forming apparatus 100 in the respective operating modes will be described next with reference to FIGS. 8 to 11. FIG. 8 is a block diagram showing power supply in the normal operating mode of the image forming apparatus 100 according to the first embodiment.

The image forming apparatus 100 includes not only the blocks for image processing shown in FIG. 3 but also a power generation unit 16, power control unit 17, and various kinds of power lines, which supply power to the process blocks. These blocks control power supply to the respective blocks in accordance with the operating mode of the image forming apparatus 100.

While a main switch 15 of the image forming apparatus 100 is ON, the power generation unit 16 always receives a predetermined voltage from a commercial power supply 18. The power generation unit 16 generates a power supply voltage necessary for the controller 11, scanner unit 13, printer unit 14, and operation unit 12 and supplies the power to the blocks via a main power line 19.

In this way, the power is supplied to the controller 11 via the main power line 19 and input to the power control unit 17. The power control unit 17 functions as a power control means and supplies power to only blocks necessary for a process via a sub power line 20 in accordance with the operating mode of the image forming apparatus 100. This suppresses the power consumption of the image forming apparatus 100 to a minimum necessary level.

Power control in the three operating modes of the image forming apparatus 100 according to this embodiment, that is, the normal operating mode, power saving mode, and HDD access mode will be explained next.

In the normal operating mode, the first power control step is performed to supply power to all blocks to do copy or PDL printing, or process scanned image data and store it in the HDD. As indicated by the bold lines in FIG. 8, the power control unit 17 supplies power to all blocks.

Figure 9:
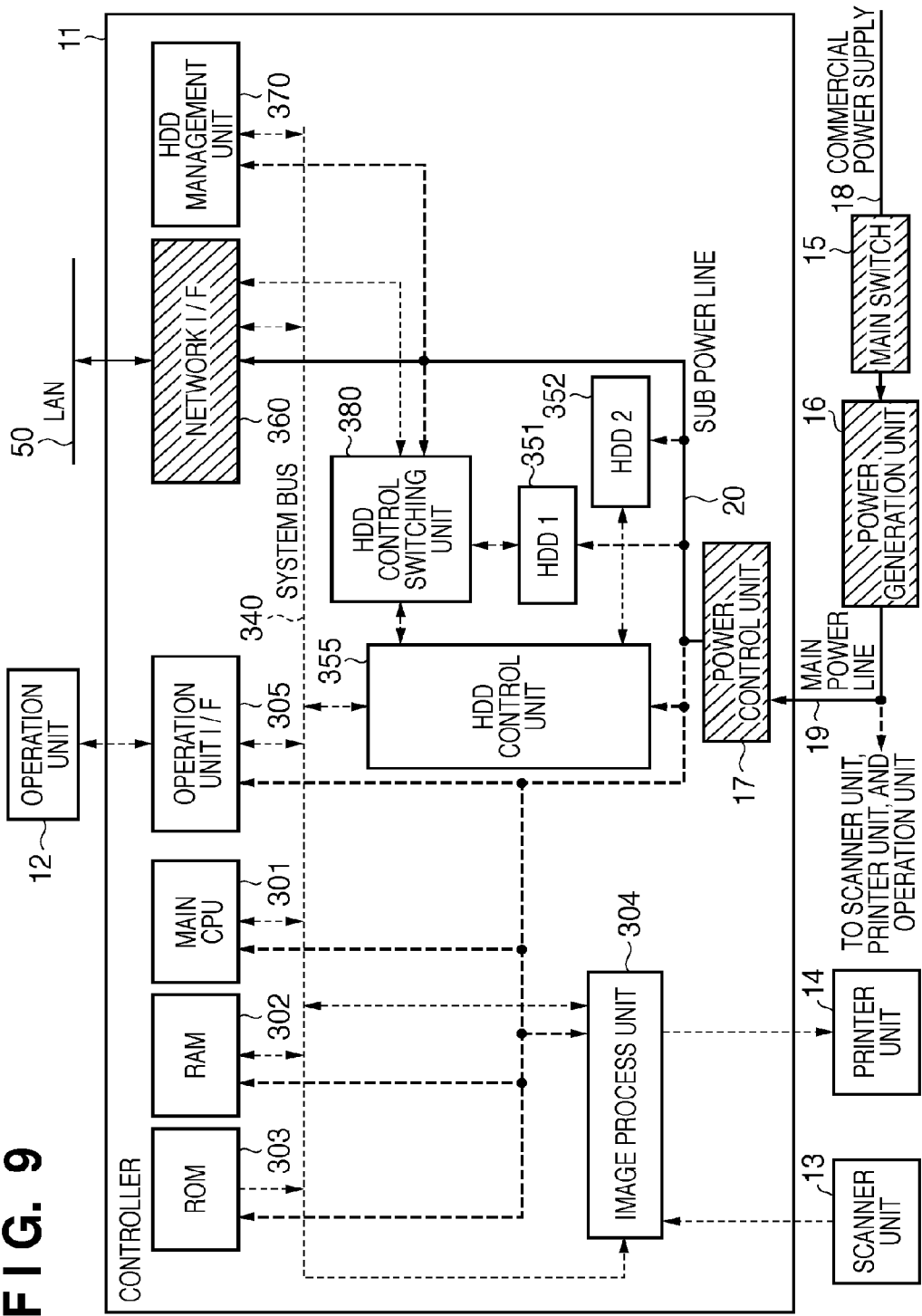
FIG. 9 is a block diagram showing power supply in the power saving mode of the image forming apparatus 100 according to the first embodiment.

In the power saving mode, the apparatus reduces the power consumption as much as possible without performing any operation such as copy, PDL printing, or scanned image data storage in the HDD, and waits for an operation instruction to transit to the normal operating mode. To respond to a query about the state of the image forming apparatus 100, which is input from the LAN 50, that is, to implement a proxy response function, power is supplied to only the network I/F 360. That is, power supply to all portions of the image forming apparatus 100 except the network I/F 360 is cut off. More specifically, as indicated by the bold lines in FIG. 9, the power control unit 17 supplies power to only the network I/F 360. FIG. 9 is a block diagram showing power supply in the power saving mode of the image forming apparatus 100 according to the first embodiment.

In the HDD access mode, data is input/output to/from the HDD 351 upon receiving an access request to the HDD 351 in the power saving mode. The second power control step is performed to supply power to portions necessary for HDD access.

According to this embodiment, in the power saving mode, the sub-CPU 365 in the network I/F 360 analyzes the contents of a request input from the LAN 50 to the network I/F 360 to read out data from the HDD or write data in the HDD. For this reason, the main CPU 301 need not be activated as in the normal operating mode. The sub-CPU 365 and the HDD control unit 361 in the network I/F 360 control data readout from the HDD or data write in the HDD. For this reason, the HDD control unit 355 need not be operated as in the normal operating mode.

Hence, if a request to read out data from the HDD is received from the LAN 50 while the information processing apparatus is operating in the power saving mode, power supply to the HDD 351 is resumed. The data readout is done under the control of the sub-CPU 365 and the HDD control unit 361 in the network I/F 360. Assume that a request to write data in the HDD is received from the LAN 50 while the information processing apparatus is operating in the power saving mode. To store the write data, the network RAM 364 in the network I/F 360 is used. The information of the written data is recorded in the HDD management unit 370 as history information and used at the time of HDD synchronization in the normal operating mode.

Figure 10:
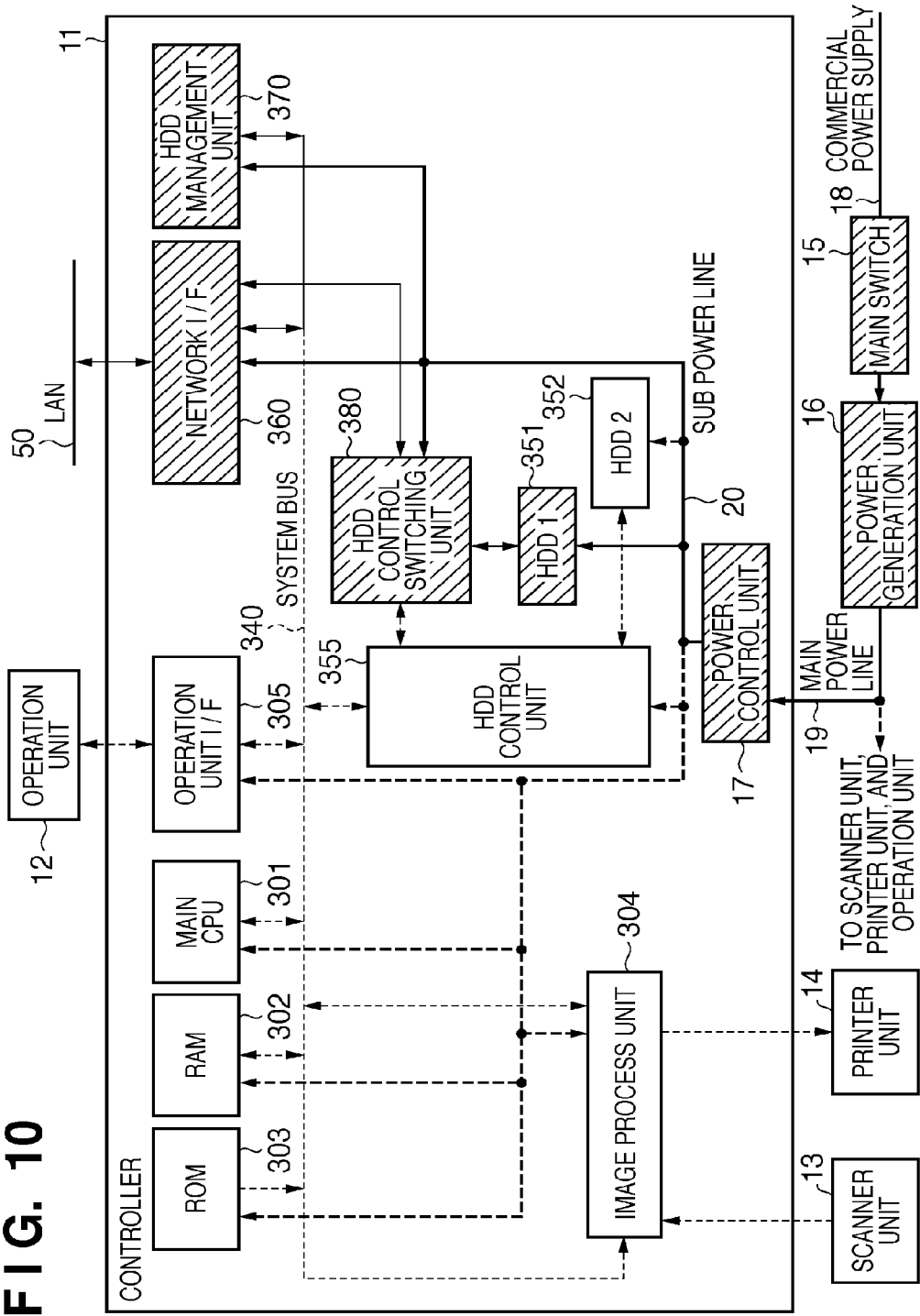
FIG. 10 is a block diagram showing power supply in the HDD access mode of the image forming apparatus 100 according to the first embodiment.

More specifically, as indicated by the bold lines in FIG. 10, the power control unit 17 supplies power to the network I/F 360, HDD management unit 370, HDD control switching unit 380, and HDD 351. FIG. 10 is a block diagram showing power supply in the HDD access mode of the image forming apparatus 100 according to the first embodiment.

Figure 11:
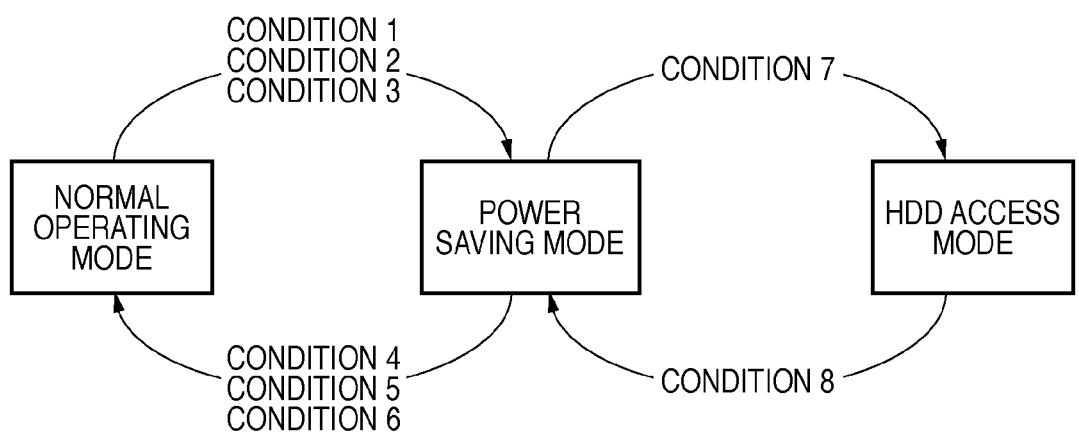
FIG. 11 is a view showing the state transition between the operating modes according to the first embodiment.

FIG. 11 is a view showing the state transition between the operating modes according to the first embodiment. As shown in FIG. 11, the operating mode is switched in accordance with the following conditions.

Conditions 1 to 3 are those for transition from the normal operating mode to the power saving mode. Conditions 4 to 6 are those for transition from the power saving mode to the normal operating mode. Condition 7 is that for transition from the power saving mode to the HDD access mode. Condition 8 is that for transition from the HDD access mode to the power saving mode. (Condition 1) user input via the operation unit 12 is not done for a predetermined time. (Condition 2) no access request is received from the LAN 50 via the network I/F 360 for a predetermined time. (Condition 3) the image forming apparatus 100 recognizes that the user has set the power saving mode using a power saving key provided on the image forming apparatus 100. (Condition 4) the user inputs an operation via the operation unit 12. (Condition 5) the proxy response function of the network I/F 360 cannot deal with an access request received from the LAN 50 via the network I/F 360. (Condition 6) the image forming apparatus 100 recognizes that the user has canceled the power saving mode using a power saving key provided on the image forming apparatus 100. (Condition 7) an HDD access request is received from the network I/F 360. (Condition 8) an operation corresponding to an access request to the HDD, which is received from the network I/F 360, is completed.

As described above, upon receiving an HDD access request in the power saving mode, the image forming apparatus 100 of this embodiment operates after transiting to the HDD access mode in which only minimum necessary functions are activated without activating the main CPU 301. The contents of the HDD 351 changed during the HDD access mode are stored as history information. Upon transiting from the power saving mode to the normal operating mode, the data in another HDD 352 is updated in accordance with the history information. If a query received from an external apparatus in the power saving mode requires access to the HDD 351, the image forming apparatus 100 activates only minimum necessary control blocks and executes the process. This decreases power consumption. Additionally, when the contents of the HDD are changed (e.g., added or deleted) in the HDD access mode, the image forming apparatus 100 can implement the mirroring function in accordance with history information in the normal operating mode.

The sub-CPU 365 in the network I/F 360, which consumes low power, thus controls access to the HDD without activating process blocks including the main CPU 301 which consumes high power. This largely reduces the power consumption of the network print system.

In this embodiment, the HDD control unit 361 in the network I/F 360 is not used in the power saving mode. However, power supply to the HDD control unit 361 may be stopped in the power saving mode by dividing the sub power line 20. This reduces the power consumption of the HDD control unit 361 in the power saving mode. When the HDD management unit 370 is provided, and the synchronization function is added to the HDD control unit, only one of the HDDs, which is normally used in mirroring, can be used as the HDD in the HDD access mode. This obviates resumption of power supply to the HDD and further reduces the power consumption.

The present invention is not limited to the above-described embodiment, and various changes and modifications can be made. For example, the image forming apparatus 100 selectively supplies power to the internal control blocks in accordance with the operating mode. More specifically, in the power saving mode, power is supplied to only the network I/F 360. In the HDD access mode, power is supplied to the HDD 351 as the access target, the network RAM 364, and the HDD management unit 370 in addition to the network I/F 360. That is, the image forming apparatus 100 can reduce the power consumption by limiting power supply in accordance with the operating mode.

The network I/F 360 according to the embodiment includes the network RAM 364 which stores, in advance, response data corresponding to each query from an external apparatus. This enables only the network I/F 360 to respond to a query from an external apparatus in the power saving mode.

The second embodiment will be described below with reference to FIGS. 12 to 17. The same reference numerals as in the first embodiment denote the same parts in the second embodiment, and a description thereof will not be repeated. More specifically, a network print system according to the second embodiment includes a PC and information processing apparatuses which are connected to a LAN. This arrangement is the same as in FIG. 1, and a detailed description thereof will be omitted. An information processing apparatus according to the second embodiment also has the same arrangement as in the first embodiment and includes a scanner unit, printer unit, controller, and operation unit. This arrangement is the same as that of the image forming apparatus 100 shown in FIG. 3, and a detailed description thereof will be omitted. To suppress power consumption, an image forming apparatus 100 according to the second embodiment has three operating modes: normal operating mode, power saving mode, and HDD access mode, as in the above-described first embodiment.

Figure 12:
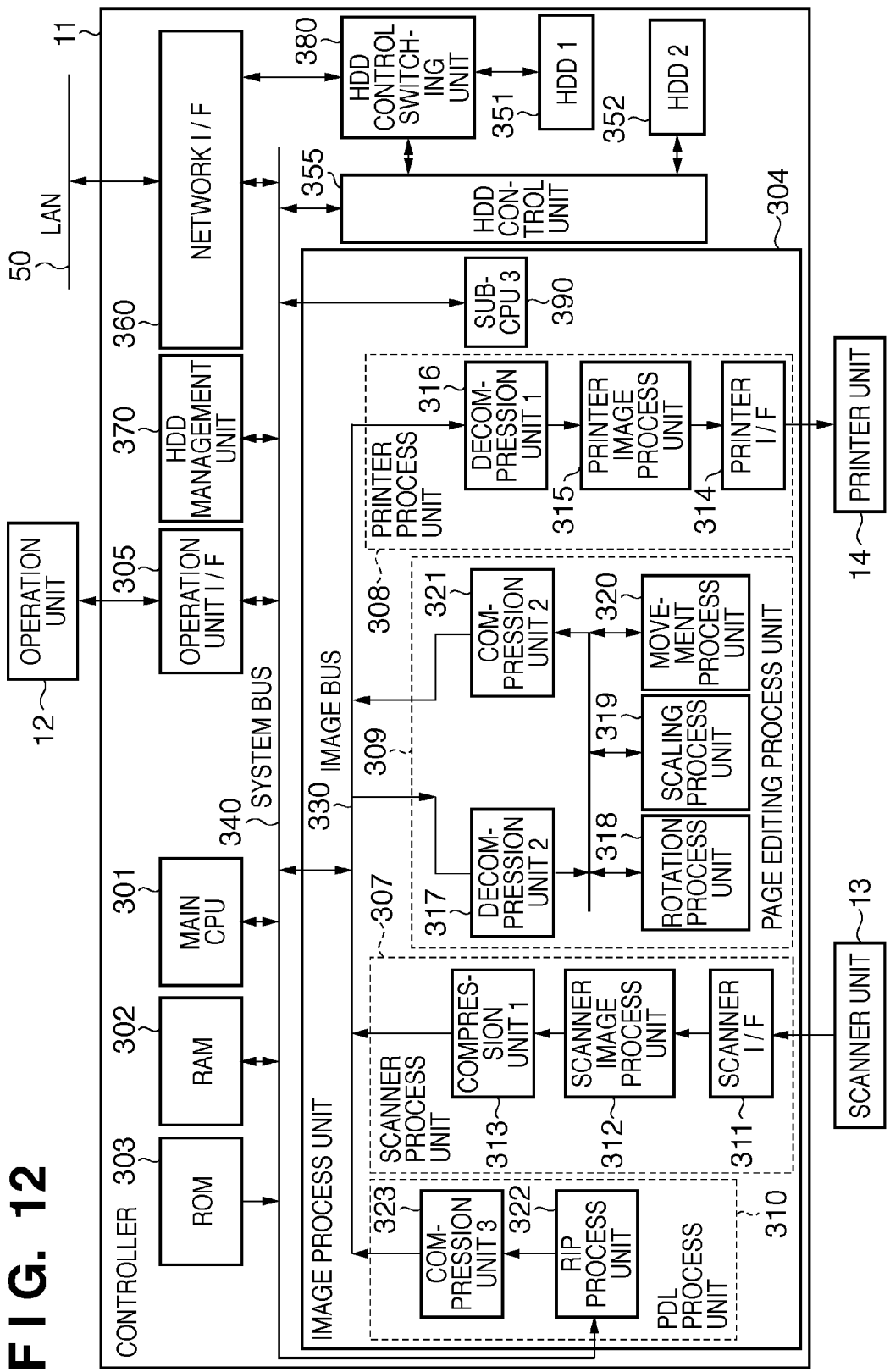
FIG. 12 is a block diagram showing the arrangement of a controller 11 of an image forming apparatus 100 according to the second embodiment.

A controller 11 of the image forming apparatus 100 according to the embodiment will be described first with reference to FIG. 12. FIG. 12 is a block diagram showing the arrangement of the controller 11 of the image forming apparatus 100 according to the second embodiment. The same reference numerals as in the first embodiment denote the same blocks in the second embodiment, and a description thereof will not be repeated.

An image process unit 304 includes a sub-CPU 390 in addition to the arrangement described in the first embodiment. The sub-CPU 390 controls the HDD or data in the image process unit 304 in the normal operating mode. A main CPU 301 controls process blocks except the image process unit 304 and performs processes such as PDL rendering. That is, in this embodiment, processes are distributed to the plurality of CPUs.

A network I/F 360, an HDD management unit 370, an HDD control switching unit 380, an HDD control unit 355, an HDD 351, and the sub-CPU 390 will be described next with reference to FIG. 13. FIG. 13 is a block diagram showing an arrangement example of the network I/F 360 and the HDD management unit 370 according to the second embodiment.

<Network I/F 360>

The network I/F 360 controls reception and transmission of various kinds of data via a LAN 50. The network I/F 360 also processes a status query from an external apparatus in the power saving mode, and upon receiving an HDD access request from the LAN 50 in the power saving mode, controls the HDD 351.

The network I/F 360 includes a sub-CPU 365, LAN I/O controller 363, network RAM 364, I/O controller 362, and HDD control unit 361. The network RAM 364 stores, in advance, response data for each access request from the LAN 50 in the power saving mode.

The sub-CPU 365 confirms the state of the LAN I/O controller 363, and upon receiving an access request to the image forming apparatus 100 from the LAN 50, analyzes the contents of the request. If a reply to the LAN 50 is necessary in response to the access request, the sub-CPU 365 reads out response data corresponding to the access request from the network RAM 364 and executes a response process.

Upon receiving an HDD access request from the LAN 50 in the power saving mode, the HDD control unit 361 controls the HDD 351 in the image forming apparatus 100. The CPU which controls the HDD 351 at this time is the sub-CPU 365.

<HDD Management Unit 370>

If the data stored in the HDD 351 have changed because of, for example, data write or data deletion upon transition to the HDD access mode, the HDD management unit 370 stores information representing the change and its contents. More specifically, if a change has occurred in the HDD 351, the HDD management unit 370 stores the name of the file, the storage directory in the HDD, and information representing deletion or addition of the file. When the mode transits to the normal operating mode, the contents of data stored in the HDD 351 are made to match the contents of data stored in an HDD 352 based on the data in the HDD management unit 370, thereby implementing a mirroring function.

The HDD management unit 370 includes an I/O controller 371 and an HDD management RAM 372. The I/O controller 371 transmits/receives control signals and data between the HDD management RAM 372 and the sub-CPU 365 in the network I/F 360 via a system bus 340. Input/output of various kinds of data to/from the HDD management RAM 372 is controlled by a control signal from the sub-CPU 365 in the network I/F 360.

<Data Input/Output To/From HDD>

An access request associated with data output from the HDD will be described. For example, another image forming apparatus (image forming apparatus 200 in this embodiment) requests readout of image data from the HDD to acquire and print the image data in the HDD of the image forming apparatus 100 via the LAN 50. In this case, the operation unit of the image forming apparatus 200 requests the image forming apparatus 100 to output a list of data stored in the HDD of the image forming apparatus 100. In response to this request, the image forming apparatus 100 sends, to the image forming apparatus 200, a list of directories in the HDD 351 and the names of files stored in the directories, which are recorded in the HDD file management unit in the HDD 351.

In the image forming apparatus 200, the received data list is displayed on the monitor of the operation unit. A file to be printed is selected based on the information. The directory and file name of a file selected by the user via the operation unit of the image forming apparatus 200 are sent to the image forming apparatus 100 via the LAN 50. Then, the image forming apparatus 100 outputs the file in the designated directory in the HDD 351.

An access request associated with data input (write) in the HDD will be described next. For example, another image forming apparatus (image forming apparatus 200 in this embodiment) transmits scanned image data to the image forming apparatus 100 via the LAN 50 and stores it in the HDD of the image forming apparatus 100. In this case, the operation unit of the image forming apparatus 200 requests output of the list of the directories in the HDD of the image forming apparatus 100. In response to this request, a list of information of the directories in the HDD 351, which are recorded in the HDD file management unit in the HDD 351, is sent to the image forming apparatus 200.

On the image forming apparatus 200, the received directory list is displayed on the monitor of the operation unit to make the user select a directory in the HDD of the image forming apparatus 100 to store the scanned data. The user is also encouraged to designate the name of the file to store the data via the operation unit of the image forming apparatus 200. After that, the image forming apparatus 200 performs the scan operation and predetermined image processing, and outputs data onto the LAN 50. At this time, the image forming apparatus 200 also outputs information representing the directory in the image forming apparatus 100 to store the scanned data and the file name to be used.

The data from the image forming apparatus 200 is sent to the image forming apparatus 100 via the LAN 50 and written in the designated directory in the HDD 351 using the designated file name. The history representing the write-accessed directory in the HDD 351 and the used file name is also recorded in the HDD management unit 370 (to be described later) and used as information in a synchronization mode (to be described later).

<HDD Control Unit 355>

The HDD control unit 355 (second control unit) according to this embodiment controls the HDDs in accordance with a control signal from the sub-CPU 390 in the image process unit 304 in the normal operating mode. The HDD control unit 355 has not only the mirroring function but also a synchronization function, which operate as a mirroring mode and a synchronization mode, respectively.

The mirroring function is a function of performing an operation of, for example, writing or deleting one data in or from both of the HDDs 351 and 352 simultaneously, like a normal mirroring operation, thereby always making the contents of the two HDDs match each other. With the mirroring function, even when one HDD becomes unusable because of, for example, a failure, the internal data can be read out from the other HDD. This implements reliable data storage.

The synchronization function is a function of making the contents recorded in the HDDs 351 and 352 match each other. In this embodiment, if the contents recorded in the HDD 351 have changed in the HDD access mode, the data contents stored in the HDD 351 are made to match the data contents stored in the HDD 352 based on the data (history information) in the HDD management unit 370. For example, if data is deleted from the HDD 351 in the HDD access mode, the same file is deleted from the HDD 352 upon transiting to the normal operating mode. Alternatively, if data is added to the HDD 351 in the HDD access mode, the file is copied from the HDD 351 to the same directory in the HDD 352 upon transiting to the normal operating mode.

<HDD Control Switching Unit 380>

The HDD control switching unit 380 includes a selector circuit. In the normal operating mode, the selector circuit switches the control of the HDD 351 to the HDD control unit 355 in accordance with an instruction from the sub-CPU 365 in the network I/F 360. In the HDD access mode, the control is switched to the HDD control unit 361 in the network I/F 360.

<HDD Control in Each Mode>

More specifically, in the normal operating mode, the HDD control switching unit 380 selects control using the HDD control unit 355. Under the control of the HDD control unit 355 an the sub-CPU 390 in the image process unit 304, the mirroring operation is performed in the two HDDs 351 and 352. At this time, the HDD control unit 355 is in the mirroring mode.

In the power saving mode, only the network I/F 360 is powered. Hence, the network I/F 360 copes with a simple response such as the status notification (e.g., notification of presence/absence of an abnormal state) of the image forming apparatus 100. When an HDD access request is input from the LAN 50 to the image forming apparatus 100, the image forming apparatus 100 transits to the HDD access mode. In this case, power supply to the HDD management unit 370, HDD control switching unit 380, and HDD 351 connected to the HDD control switching unit 380 is resumed to do data input/output to/from the HDD 351 in accordance with a request from the sub-CPU 365 in the network I/F 360. The HDD control switching unit 380 switches the control of the HDD 351 to the sub-CPU 365 and the HDD control unit 361 in the network I/F 360.

If the contents of the HDD 351 which is operating in the HDD access mode have changed due to, for example, write or deletion, the state is stored in the HDD management unit 370 as history information. When the power saving mode transits to the normal operating mode, power supply to the process blocks including the image process unit 304, the sub-CPU 390 in it, the main CPU 301, and the HDD control unit 355 is resumed. The HDD control switching unit 380 switches the control of the HDD 351 to the HDD control unit 355 and the sub-CPU 390 in the image process unit 304.

When the power saving mode transits to the normal operating mode, the sub-CPU 390 determines whether history information representing a change in the contents of the HDD 351 is stored in the HDD management unit 370. If the history information is stored, the HDD control unit 355 transits to the synchronization mode. The HDD control unit 355 reflects the changed contents of the data stored in the HDD 351 which was operated in the power saving mode on the HDD 352 which was powered off then, thereby making the contents of the data stored in the two HDDs match each other.

When the data contents stored in the HDDs 351 and 352 match, the HDD control unit 355 switches to the mirroring mode in the normal operating mode so that the image forming apparatus 100 also performs a normal operation.

Figure 14:
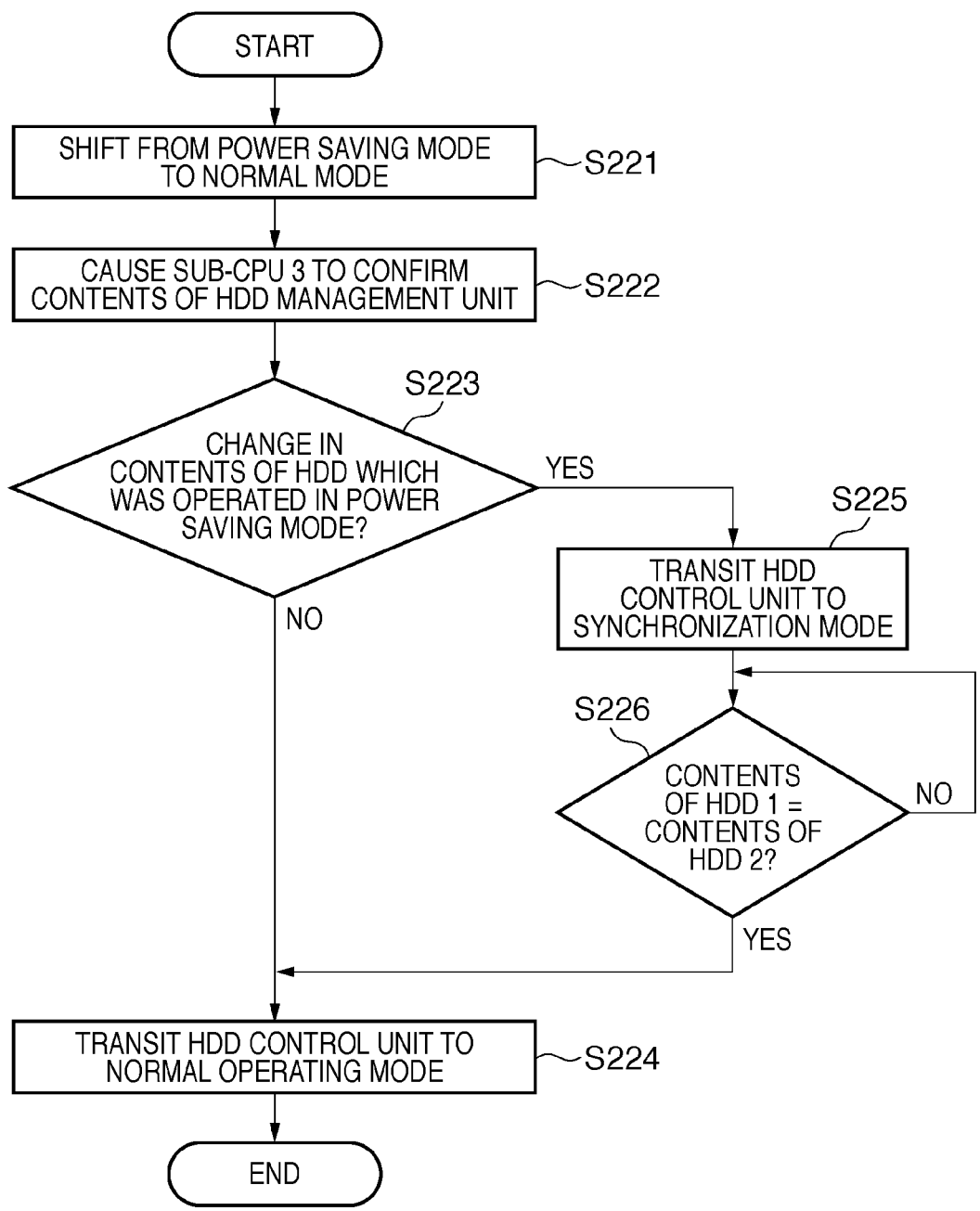
FIG. 14 is a flowchart illustrating the process procedure of an HDD control unit 355 according to the second embodiment.

FIG. 14 is a flowchart illustrating the process procedure of the HDD control unit 355 according to the second embodiment.

In step S221, the operating mode of the image forming apparatus 100 transits from the power saving mode to the normal operating mode so that the apparatus is activated as the process blocks are powered on.

In steps S222 and S223, the sub-CPU 390 confirms the contents of the HDD management unit 370 and determines whether the contents of data stored in the HDD 351 which was operated in the power saving mode have changed. Upon determining that "no change has occurred" (NO in step S223), the sub-CPU 390 advances the process to step S224. On the other hand, upon determining that "a change has occurred" (YES in step S223), the sub-CPU 390 advances the process to step S225.

In step S224, the HDD control unit 355 transits the state to the mirroring mode in the normal operating mode and ends the process. The image forming apparatus 100 also transits to the normal operating mode.

In step S225, the HDD control unit 355 transits the state to the synchronization mode in the normal operating mode and reflects the change contents of the HDD 351 to the HDD 352.

In step S226, the HDD control unit 355 determines whether the contents of data stored in the HDD 351 match those in the HDD 352. If the contents match (YES in step S226), the HDD control unit 355 advances the process to step S224 to transit the operating mode to the normal operating mode. If the contents do not match (NO in step S226), the HDD control unit 355 periodically performs the determination in step S226 until the contents of the two HDDs 351 and 352 match.

<Power Supply>

Figure 15:
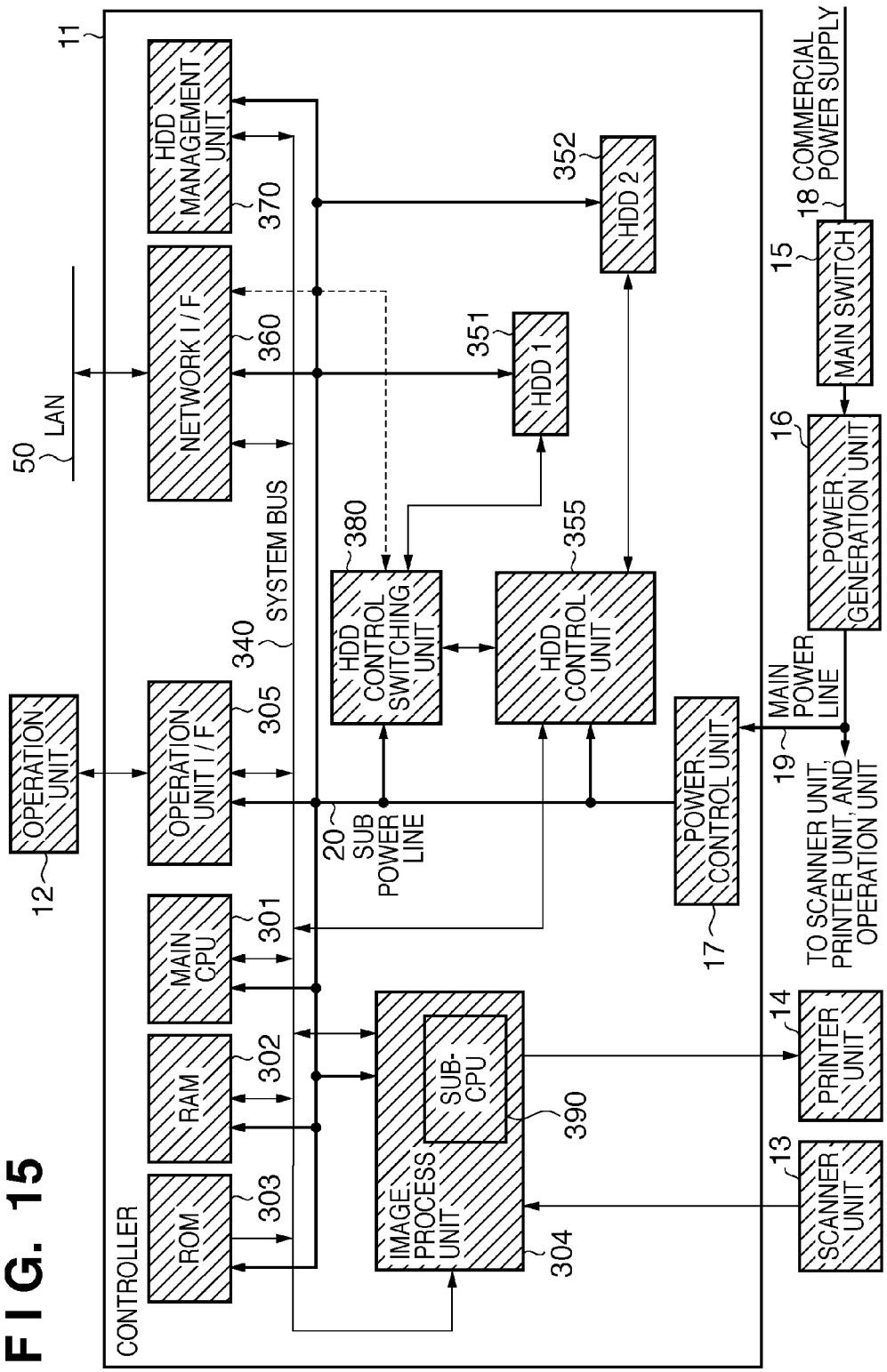
FIG. 15 is a block diagram showing power supply in the normal operating mode of the image forming apparatus 100 according to the second embodiment.
Figure 16:
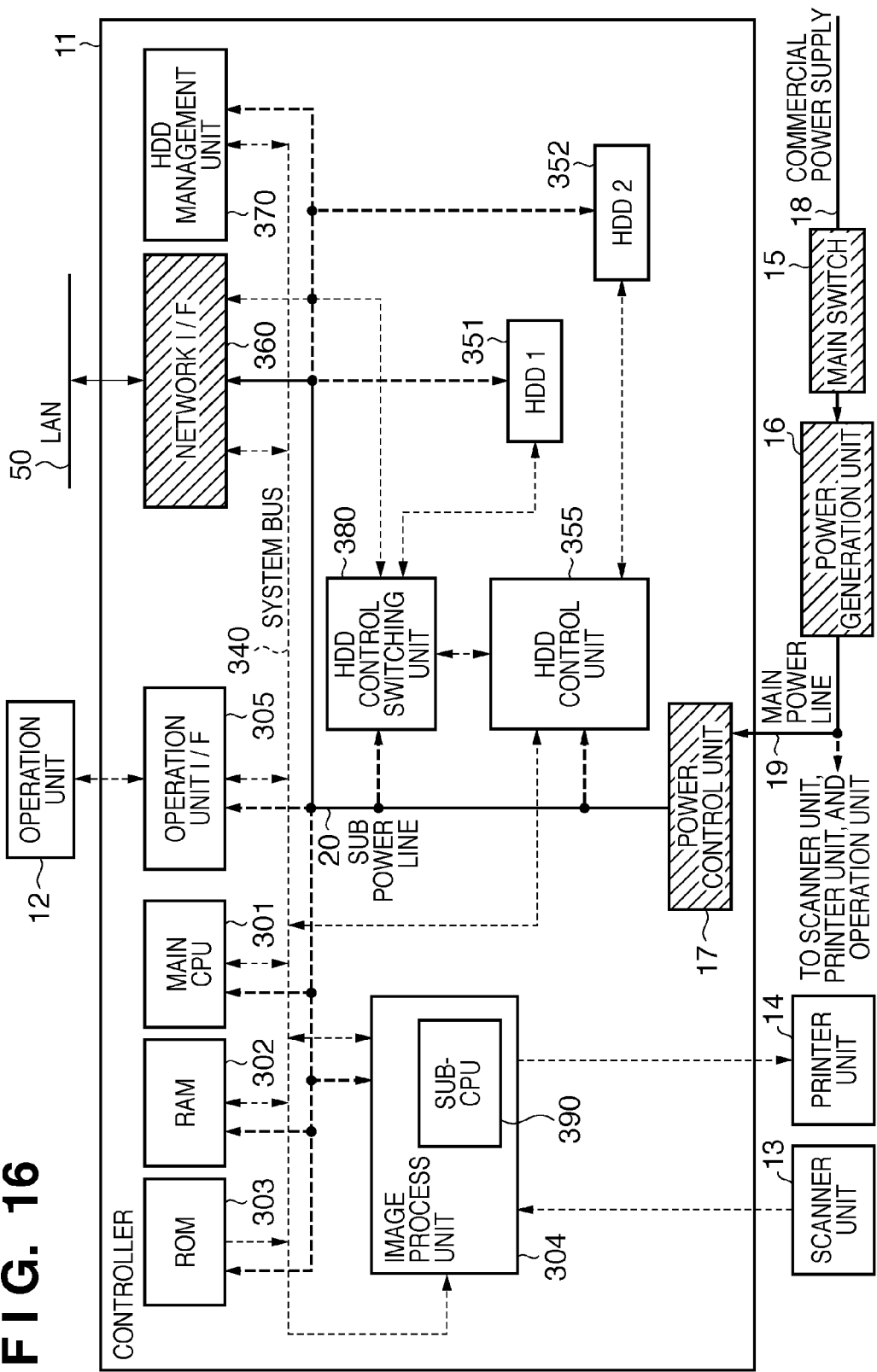
FIG. 16 is a block diagram showing power supply in the power saving mode of the image forming apparatus 100 according to the second embodiment.

Power supply to the process blocks of the image forming apparatus 100 according to this embodiment will be described next with reference to FIGS. 15 to 17. FIG. 15 is a block diagram showing power supply in the normal operating mode of the image forming apparatus 100 according to the second embodiment. The image forming apparatus 100 includes a power generation unit 16, power control unit 17, and various kinds of power lines, which supply power to the process blocks, as in the first embodiment. These blocks control power supply to the respective blocks in accordance with the operating mode of the image forming apparatus 100.

While a main switch 15 of the image forming apparatus 100 is ON, the power generation unit 16 always receives a predetermined voltage from a commercial power supply 18. The power generation unit 16 generates a power supply voltage necessary for the controller 11, scanner unit 13, printer unit 14, and operation unit 12 and supplies the power to the blocks via a main power line 19.

In this way, the power is supplied to the controller 11 via the main power line 19 and input to the power control unit 17. The power control unit 17 controls and supplies power to only blocks necessary for a process via a sub power line 20 in accordance with the operating mode of the image forming apparatus 100. This suppresses the power consumption of the image forming apparatus 100 to a minimum necessary level.

Power control in the three operating modes of the image forming apparatus 100 according to this embodiment, that is, the normal operating mode, power saving mode, and HDD access mode will be explained next.

In the normal operating mode, power is supplied to all blocks to do copy or PDL printing, or process scanned image data and store it in the HDD. As indicated by the bold lines in FIG. 15, the power control unit 17 supplies power to all blocks.

In the power saving mode, the apparatus reduces the power consumption as much as possible without performing any operation such as copy, PDL printing, or scanned image data storage in the HDD, and waits for an operation instruction to transit to the normal operating mode. To respond to a query about the state of the image forming apparatus, which is input from the LAN 50, that is, to implement a proxy response function, power is supplied to only the network I/F 360. That is, power supply to all portions of the image forming apparatus 100 except the network I/F 360 is cut off. More specifically, as indicated by the bold lines in FIG. 16, the power control unit 17 supplies power to only the network I/F 360. FIG. 16 is a block diagram showing power supply in the power saving mode of the image forming apparatus 100 according to the second embodiment.

In the HDD access mode, data is input/output to/from the HDD upon receiving an HDD access request in the power saving mode. Power is supplied to portions necessary for HDD access.

According to this embodiment, in the power saving mode, the sub-CPU 365 in the network I/F 360 analyzes the contents of a request input from the LAN 50 to the network I/F 360 to read out data from the HDD or write data in the HDD. For this reason, the main CPU 301 and the sub-CPU 390 need not be activated as in the normal operating mode. The sub-CPU 365 and the HDD control unit 361 in the network I/F 360 control data readout from the HDD or data write in the HDD. For this reason, the HDD control unit 355 need not be operated as in the normal operating mode.

Hence, if a request to read out data from the HDD is received from the LAN 50 while the information processing apparatus is operating in the power saving mode, power supply to the HDD 351 is resumed. The data readout is done under the control of the sub-CPU 365 and the HDD control unit 361 in the network I/F 360. Assume that a request to write data in the HDD is received from the LAN 50 while the information processing apparatus is operating in the power saving mode. To store the write data, the network RAM 364 in the network I/F 360 is used. The information of the written data is recorded in the HDD management unit 370 and used at the time of HDD synchronization in the normal operating mode.

Figure 17:
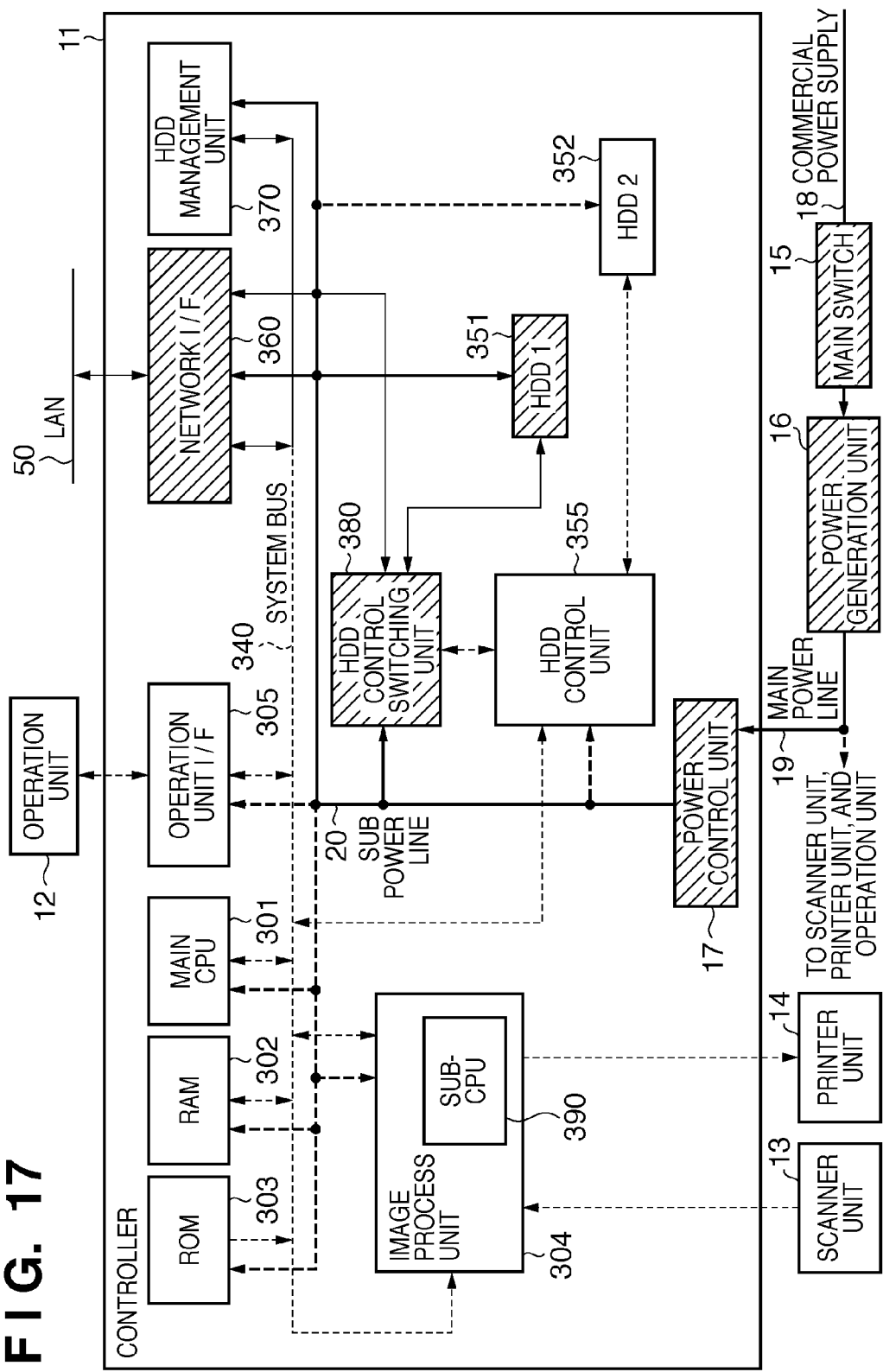
FIG. 17 is a block diagram showing power supply in the HDD access mode of the image forming apparatus 100 according to the second embodiment.

More specifically, as indicated by the bold lines in FIG. 17, the power control unit 17 supplies power to the network I/F 360, HDD management unit 370, HDD control switching unit 380, and HDD 351. FIG. 17 is a block diagram showing power supply in the HDD access mode of the image forming apparatus 100 according to the second embodiment.

The transition of the modes is the same as in FIG. 11 described in the first embodiment, and a detailed description thereof will not be repeated.

As described above, in this embodiment, even when the image forming apparatus 100 as an information processing apparatus is distributedly controlled by a plurality of CPUs, the power consumption can be reduced while maintaining the mirroring function. More specifically, upon receiving an HDD access request in the power saving mode, the image forming apparatus 100 of this embodiment operates after transiting to the HDD access mode in which only minimum necessary functions are activated without activating the main CPU 301. The contents of the HDD 351 changed during the HDD access mode are stored as history information. Upon transiting from the power saving mode to the normal operating mode, the data in another HDD 352 is updated in accordance with the history information. If a query received from an external apparatus in the power saving mode requires access to the HDD 351, the image forming apparatus 100 activates only minimum necessary control blocks and executes the process. This decreases power consumption. Additionally, when the contents of the HDD are changed (e.g., added or deleted) in the HDD access mode, the image forming apparatus 100 can implement the mirroring function in accordance with history information in the normal operating mode.

The sub-CPU 365 in the network I/F 360, which consumes low power, thus controls access to the HDD without activating process blocks including the main CPU 301 which consumes high power. This largely reduces the power consumption of the network print system.

In this embodiment, the HDD control unit 361 in the network I/F 360 is not used in the power saving mode. However, power supply to the HDD control unit 361 may be stopped in the power saving mode by dividing the sub power line 20. This reduces the power consumption of the HDD control unit 361 in the power saving mode. When the HDD management unit 370 is provided, and the synchronization function is added to the HDD control unit, only one of the HDDs, which is normally used in mirroring, can be used as the HDD in the HDD access mode. This obviates resumption of power supply to the HDD and further reduces the power consumption.

The present invention is not limited to the above-described embodiment, and various changes and modifications can be made. For example, the image forming apparatus 100 selectively supplies power to the internal control blocks in accordance with the operating mode. More specifically, in the power saving mode, power is supplied to only the network I/F 360. In the HDD access mode, power is supplied to the HDD 351 as the access target, the network RAM 364, the HDD management unit 370, and the sub-CPU 390 in addition to the network I/F 360. That is, the image forming apparatus 100 can reduce the power consumption by limiting power supply in accordance with the operating mode.

The network I/F 360 according to the embodiment includes the network RAM 364 which stores, in advance, response data corresponding to each query from an external apparatus. This enables only the network I/F 360 to respond to a query from an external apparatus in the power saving mode.

According to the present invention, it is possible to provide an information processing apparatus which includes a first storage unit and a second storage unit and implements a function of causing the first storage unit and the second storage unit to store data redundantly while maintaining a power saving mode even upon receiving an access request from an external apparatus in the power saving mode, and a method of controlling the same.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-037948, filed on Feb. 19, 2008, which is hereby incorporated by reference herein in its entirety.

What is claimed is:

1. An information processing apparatus for handling a request to access a storage device in a power saving mode without activating a main CPU comprising a receiving unit that receives data, a first storage unit which is nonvolatile, and a second storage unit which is nonvolatile, the information processing apparatus operating in a plurality of power modes including a first power mode in which power is supplied to the receiving unit, the first storage unit, and the second storage unit, a second power mode in which power is supplied to the receiving unit, and is not supplied to the first storage unit and the second storage unit, and, a third power mode in which power is supplied to the receiving unit and the first storage unit, and is not supplied to the second storage unit, the information processing apparatus further comprising:
a first writing unit that writes, when the receiving unit receives the data in the first power mode, the received data into the first storage unit and the second storage unit;
a second writing unit that, in a case that the receiving unit receives the data when the information processing apparatus is in the second power mode, switches the information processing apparatus to the third power mode and writes the received data into the first storage unit, and, in response to completion of writing the received data into the first storage unit, switches the information processing apparatus to the second power mode; and
a third writing unit that writes, when the information processing apparatus is changed to the first power mode, the received data, which was written into the first storage unit in the third power mode, into the second storage unit.

2. The information processing apparatus according to claim 1, further comprising a holding unit that holds history information of the received data written into the first storage unit in the third power mode,
wherein the third writing unit writes, in case that there is history information when the information processing apparatus is changed to the first power mode, the received data, which was written into the first storage unit in the third power mode, into the second storage unit in accordance with the history information held by the holding unit.

3. The information processing apparatus according to claim 1, wherein the first writing unit is activated in the first power mode and is not activated in the third power mode.

4. The information processing apparatus according to claim 1, further comprising
a third storage unit that stores data for responding to an access request from an external apparatus; and
a transmitting unit that transmits, to the external apparatus, the data stored in the third storage unit corresponding to the access request from the external apparatus when the access request can be responded to using the data stored in the third storage unit.

5. The information processing apparatus according to claim 4, further comprising a changing unit that changes the information processing apparatus between power modes of the plurality of power modes.

6. The information processing apparatus according to claim 5, wherein the changing unit changes the information processing apparatus to the second power mode when an instruction is not received from an operating unit for a predetermined time, the access request is not received from the external apparatus for the predetermined time, or the operating unit instructs a change from the first power mode to the second power mode.

7. The information processing apparatus according to claim 5, wherein the changing unit changes the information processing apparatus to the first power mode when an operating unit instructs a change to the first power mode, the access request is received from the external apparatus, or the operating unit instructs deactivation of the second power mode in the second power mode.

8. A method of controlling an information processing apparatus for handling a request to access a storage device in a power saving mode without activating a main CPU comprising a receiving unit that receives data, a first storage unit which is nonvolatile, and a second storage unit which is nonvolatile, and having a plurality of power modes including a first power mode in which power is supplied to the receiving unit, the first storage unit, and the second storage unit, a second power mode in which power is supplied to the receiving unit, and is not supplied to the first storage unit and the second storage unit, and, a third power mode in which power is supplied to the receiving unit and the first storage unit, and is not supplied to the second storage unit, the method comprising:
writing, when the received data is received when the information processing unit is in the first power mode, the received data into the first storage unit and the second storage unit;
switching, in a case that the received data is received when the information processing apparatus is in the second power mode, the information processing apparatus to the third power mode;
writing, in a case that the received data is received when the information processing apparatus is in the second power mode, the received data into the first storage unit;

switching the information processing apparatus to the second power mode in response to completion of writing the received data into the first storage unit; and writing, when the information processing apparatus is changed to the first power mode, the received data, which was written into the first storage unit in the third power mode, into the second storage unit.

* * * * *